United States Patent
Frank et al.

(10) Patent No.: US 10,425,595 B2
(45) Date of Patent: Sep. 24, 2019

(54) MODULAR CAMERA SYSTEMS AND METHODS

(71) Applicant: FLIR Systems, Inc., Wilsonville, OR (US)

(72) Inventors: Jeffrey D. Frank, Santa Barbara, CA (US); Yves Chappaz, Goleta, CA (US); Mary L. Deal, Santa Maria, CA (US); Patrick B. Richardson, Santa Barbara, CA (US); Austin A. Richards, Santa Barbara, CA (US); Nicholas Högasten, Santa Barbara, CA (US); James T. Woolaway, Santa Barbara, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 400 days.

(21) Appl. No.: 13/975,104

(22) Filed: Aug. 23, 2013

(65) Prior Publication Data
US 2014/0313343 A1    Oct. 23, 2014

Related U.S. Application Data

(63) Continuation of application No. PCT/US2012/026187, filed on Feb. 22, 2012, and a
(Continued)

(51) Int. Cl.
*G06K 9/00* (2006.01)
*G06K 9/20* (2006.01)
(Continued)

(52) U.S. Cl.
CPC .......... *H04N 5/33* (2013.01); *G06K 9/00362* (2013.01); *G06K 9/2018* (2013.01); *G06T 5/007* (2013.01);
(Continued)

(58) Field of Classification Search
CPC ........................................................ H04N 5/33
(Continued)

(56) References Cited

U.S. PATENT DOCUMENTS 5,463,742 A * 10/1995 Kobayashi ............ G06F 1/1632
361/679.41
6,496,652 B1 * 12/2002 Mikami ................. G03B 17/02
396/299
(Continued)

FOREIGN PATENT DOCUMENTS

CN        1294313        5/2001
CN        1685702        10/2005
(Continued)

OTHER PUBLICATIONS

Therrien C.W., J.W. Scrofani, and W.K. Krebs, An Adaptive Technique for the Enhanced Fusion of Low-Light Visible with Uncooled Thermal Infrared Imagery, Image Processing, 1997, Proceedings., International Conference Oct. 26-29, 1997, 405-408 vol. 1, doi: 10.1109/ICIP.1997.647792, IEEE (please refer to IEEE website http://ieeexplore.ieee.org).*
(Continued)

*Primary Examiner* — Richard A Hansell, Jr.
(74) *Attorney, Agent, or Firm* — Haynes and Boone, LLP

(57) ABSTRACT

Modular infrared imaging systems and methods disclosed herein, in accordance with one or more embodiments, provide for capturing an infrared image, sensing a mode of operation, processing the captured infrared image according to the sensed mode of operation, generating a processed infrared image based on the sensed mode of operation, and displaying the processed infrared image.

23 Claims, 25 Drawing Sheets

Related U.S. Application Data continuation-in-part of application No. 13/761,803, filed on Feb. 7, 2013, now Pat. No. 8,659,661, which is a continuation of application No. 11/946,801, filed on Nov. 28, 2007, now Pat. No. 8,384,780, application No. 13/975,104, which is a continuation-in-part of application No. 11/946,798, filed on Nov. 28, 2007, now Pat. No. 8,817,106.

(60) Provisional application No. 61/446,950, filed on Feb. 25, 2011.

(51) Int. Cl.
G06T 5/00 (2006.01)
G06T 7/00 (2017.01)
G06T 7/70 (2017.01)
H04N 5/33 (2006.01)
H04N 7/18 (2006.01)
G08B 21/08 (2006.01)

(52) U.S. Cl.
CPC ............... *G06T 7/00* (2013.01); *G06T 7/70* (2017.01); *H04N 7/181* (2013.01); *G06T 2207/10016* (2013.01); *G06T 2207/10048* (2013.01); *G06T 2207/20061* (2013.01); *G06T 2207/30196* (2013.01); *G06T 2207/30252* (2013.01); *G08B 21/08* (2013.01)

(58) Field of Classification Search
USPC ........................................................ 348/164
See application file for complete search history.

(56) References Cited

U.S. PATENT DOCUMENTS

| | | | | |
|---|---|---|---|---|
| 8,566,498 | B2* | 10/2013 | Lemarchand | H04L 67/306 710/303 |
| 2003/0146364 | A1* | 8/2003 | Gates | B62J 11/00 248/534 |
| 2003/0235342 | A1* | 12/2003 | Gindele | H04N 1/4074 382/260 |
| 2006/0033998 | A1* | 2/2006 | King | G02B 23/12 359/630 |
| 2006/0153450 | A1* | 7/2006 | Woodfill | G06K 9/00791 382/173 |
| 2006/0188246 | A1* | 8/2006 | Terre | G06T 5/009 396/275 |
| 2008/0310714 | A1* | 12/2008 | Stern | G06T 5/009 382/169 |
| 2009/0309998 | A1* | 12/2009 | Grosvenor | G06T 5/40 348/241 |
| 2010/0100275 | A1* | 4/2010 | Mian | G01M 17/013 701/31.4 |
| 2011/0013841 | A1* | 1/2011 | Blain | G06K 9/00651 382/174 |
| 2011/0162035 | A1* | 6/2011 | King | G06F 1/1632 726/1 |
| 2011/0199489 | A1* | 8/2011 | Fischer | H04N 5/33 348/164 |
| 2012/0254493 | A1* | 10/2012 | Wang | G06F 1/1632 710/303 |
| 2013/0240733 | A1* | 9/2013 | Plotsker | G02B 13/14 250/338.1 |
| 2013/0329183 | A1* | 12/2013 | Blum | G02C 11/10 351/158 |
| 2015/0009325 | A1* | 1/2015 | Kardashov | H04N 7/183 348/143 |

FOREIGN PATENT DOCUMENTS

| | | | |
|---|---|---|---|
| CN | 1748167 | 3/2006 | |
| GB | 2353428 | 2/2001 | |
| WO | WO 2005119594 A2 * | 12/2005 | ......... G06K 9/00798 |
| WO | WO-2005119594 A2 * | 12/2005 | ......... G06K 9/00798 |
| WO | WO/2009008778 | 1/2009 | |
| WO | WO/2010141772 | 12/2010 | |
| WO | WO 2010141772 A1 * | 12/2010 | ............... H04N 5/33 |
| WO | WO-2010141772 A1 * | 12/2010 | ............... H04N 5/33 |

OTHER PUBLICATIONS

Spampinato L., S. Calvari, C. Oppenheimer, E. Boschi (Volcano surveillance using infrared cameras, Earth-Science Reviews 106 (2011) 63-91).*

Chacon, M. And F.J. Perez-Vargas, Thermal video analysis for fire detection using shape regularity and intensity saturation features, conference paper, Jan. 2011, doi:10.1007/978-3-642-21587-2_13.*

Therrien C.W., J.W. Scrofani, and W.K. Krebs, An Adaptive Technique for the Enhanced Fusion of Low-Light Visible with Uncooled Thermal Infrared Imagery, Image Processing, 1997, Proceedings., International Conference Oct. 26-29, 1997, 405-408 vol. 1, doi: 10.1109/ICIP. 1997.647792, IEEE (Year: 1997).*

Spampinato L., S. Calvari, C. Oppenheimer, E. Boschi (Volcano surveillance using infrared cameras, Earth-Science Reviews 106 (2011) 63-91) (Year: 2011).*

Chacon, M. And F.J. Perez-Vargas, Thermal video analysis for fire detection using shape regularity and intensity saturation features, conference paper, Jan. 2011, doi:10.1007/978-3-642-21587-2_13 (Year: 2011).*

* cited by examiner

MODULAR CAMERA SYSTEMS AND METHODS

CROSS-REFERENCE TO RELATED APPLICATIONS

This application is a continuation of International Patent Application No. PCT/US2012/026187 filed Feb. 22, 2012, which claims priority to U.S. Provisional Patent Application No. 61/446,950 filed Feb. 25, 2011, which are all incorporated herein by reference in their entirety.

This application is a continuation-in-part of U.S. patent application Ser. No. 13/761,803 filed Feb. 7, 2013, which is a continuation of U.S. patent application Ser. No. 11/946,801 filed Nov. 28, 2007 (now U.S. Pat. No. 8,384,780), which are all incorporated herein by reference in their entirety.

This application is a continuation-in-part of U.S. patent application Ser. No. 11/946,798 filed Nov. 28, 2007, which is incorporated herein by reference in its entirety.

TECHNICAL FIELD

The present disclosure relates to infrared imaging systems and, in particular, to modular infrared camera systems and methods.

BACKGROUND

Infrared cameras are utilized in a variety of imaging applications to capture infrared images. For example, infrared cameras may be utilized for maritime applications to enhance visibility under various conditions for naval navigation, while other infrared cameras may be utilized for other applications such as for an off-road vehicle. However, there are a number of drawbacks for conventional application approaches for infrared cameras.

As an example, one drawback is that a user may have to purchase an infrared camera for each different application, such as for a maritime application or an off-road vehicle application, with resulting costs, maintenance, and related burdens associated with numerous infrared cameras. Another drawback is that each application typically requires a different infrared camera configuration along with various user settings and processing techniques, which, if not implemented and selected properly by a user, may result in a less than desirable image being captured and displayed.

Accordingly, there is a need for an improved infrared camera that may be used for a variety of infrared camera applications.

SUMMARY

Systems and methods disclosed herein provide modular infrared camera techniques in accordance with one or more embodiments. For example for one or more embodiments, systems and methods are disclosed that may provide automatically configurable characteristics and functionality based on the various applications. As a specific example, an infrared camera may be used in a modular fashion for a variety of infrared camera applications and be adaptable to provide improved embodiment and processing techniques for these various infrared imaging applications, in accordance with one or more embodiments.

In one or more embodiments, the modular infrared camera system includes a self-contained, adaptive, and/or portable device that is configured to mount or couple to various different adapters (e.g., mounts or docking stations) and automatically configure itself for the intended use based on the associated adapter. The modular infrared camera system may include a small (e.g., palm-sized) device with a mobile power source (e.g., batteries) and components adapted for use with various applications, such as a helmet camera, a maritime vessel, a car camera, a bicycle camera, a home use, a handheld camera, or various other applications. For example for an embodiment, image processing techniques are disclosed to allow for suppression of unwanted features, such as noise, and/or refinement of captured infrared images based on a given application or use of the infrared camera.

The modular infrared camera system for an embodiment may provide user convenience with portability, ease of use, and wireless capability (e.g., to a wireless display, such as a cell phone, a smart phone, a tablet, a laptop, or a vehicle's display). In an embodiment, a user may command the modular infrared camera system to a designated configuration for a desired application (e.g., select the desired configuration via the wireless display having a touch screen or other user-input control). In another embodiment, the modular infrared camera system may have a default setting, which may be used, for example, if no mount is sensed (e.g., freeform use and held with no mount, with images displayed on a wireless display). Furthermore, the modular infrared camera system for an embodiment may provide the user with the capability of night vision for safer night activities, such as walking, athletics, travel, and other activities, which may involve various modes of transportation including cycling, automobiles, watercraft, aircraft, etc.

In one or more embodiments, an infrared camera system includes an image capture component adapted to capture an infrared image, a mode sensing component adapted to automatically sense an intended application for the infrared camera system corresponding to a mode of operation and provide a first control signal indicative of the sensed mode of operation. The infrared camera system may include a processing component adapted to receive the first control signal from the mode sensing component, process the captured infrared image according to the sensed mode of operation, and generate a processed infrared image, and a memory component adapted to store the processed infrared image.

In one or more embodiments, a method for processing an infrared image from an infrared detector includes sensing an intended application of use for the infrared detector corresponding to a mode of operation; setting the mode of operation for processing the infrared image; and capturing the infrared image. The method may further include processing the captured infrared image according to the sensed mode of operation; generating a processed infrared image based on the sensed mode of operation; and storing and/or displaying the processed infrared image.

As an example, if the sensed mode of operation comprises a vehicle or cycle application, then for one or more embodiments the captured image may be processed to provide a basic monochrome display with selected automatic gain control parameters and pedestrian and/or animal detection enabled to provide to the display component. If the sensed mode of operation comprises a maritime application, then for one or more embodiments the captured image may be processed to provide a red hue display and with maritime automatic gain control selections to provide to the display component. If the sensed mode of operation comprises a handheld application, then for one or more embodiments the captured image may be processed to provide a selection between monochrome and color modes, absolute temperature readout, image capture capability, and/or a low power mode of operation.

The display component may be adapted to display the processed infrared image in at least one of a black hot palette, a white hot palette, a red color palette, and a green color palette in accordance with one or more embodiments. The system may include a memory component, adapted to store at least one of the captured infrared image and the processed infrared image, and an environmental sensing component adapted to provide environmental information to the processing component. The system may include a control component adapted to provide a plurality of selectable processing modes to a user, receive a user input corresponding to a user selected processing mode, and provide a second control signal indicative of the user selected processing mode. The processing component may be adapted to receive the second control signal from the control component, process the captured infrared image according to the user selected processing mode, and generate the processed infrared image according to the user selected processing mode. The display component may be adapted to display the processed infrared image according to the user selected processing mode.

In one or more embodiments, a user may select or the system may automatically configure itself for various types of maritime applications. For example, the plurality of selectable processing modes may include a night docking mode that causes the processing component to histogram equalize and scale the captured infrared image to generate the processed infrared image according to the user selected processing mode. The plurality of selectable processing modes may include a man overboard mode that causes the processing component to apply a high pass filter to the captured infrared image to generate the processed infrared image according to the user selected processing mode. The plurality of selectable processing modes may include a night cruising mode that causes the processing component to extract a detailed part and a background part from the captured infrared image, separately scale the detailed part, separately histogram equalize and scale the background part, and add the detailed part to the background part to generate the processed infrared image according to the user selected processing mode. The plurality of selectable processing modes may include a day cruising mode that causes the processing component to extract a detailed part and a background part from the captured infrared image, separately scale the detailed part, separately histogram equalize and scale the background part, and add the detailed part to the background part to generate the processed infrared image according to the user selected processing mode. The plurality of selectable processing modes may include a hazy conditions mode that causes the processing component to apply a non-linear low pass filter on the captured infrared image, and then histogram equalize and scale the filtered image to generate the processed infrared image according to the user selected processing mode. The plurality of selectable processing modes may include a shoreline mode that causes the processing component to apply a Huff or Hough transform operation to the captured infrared image to generate the processed infrared image according to the user selected processing mode.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
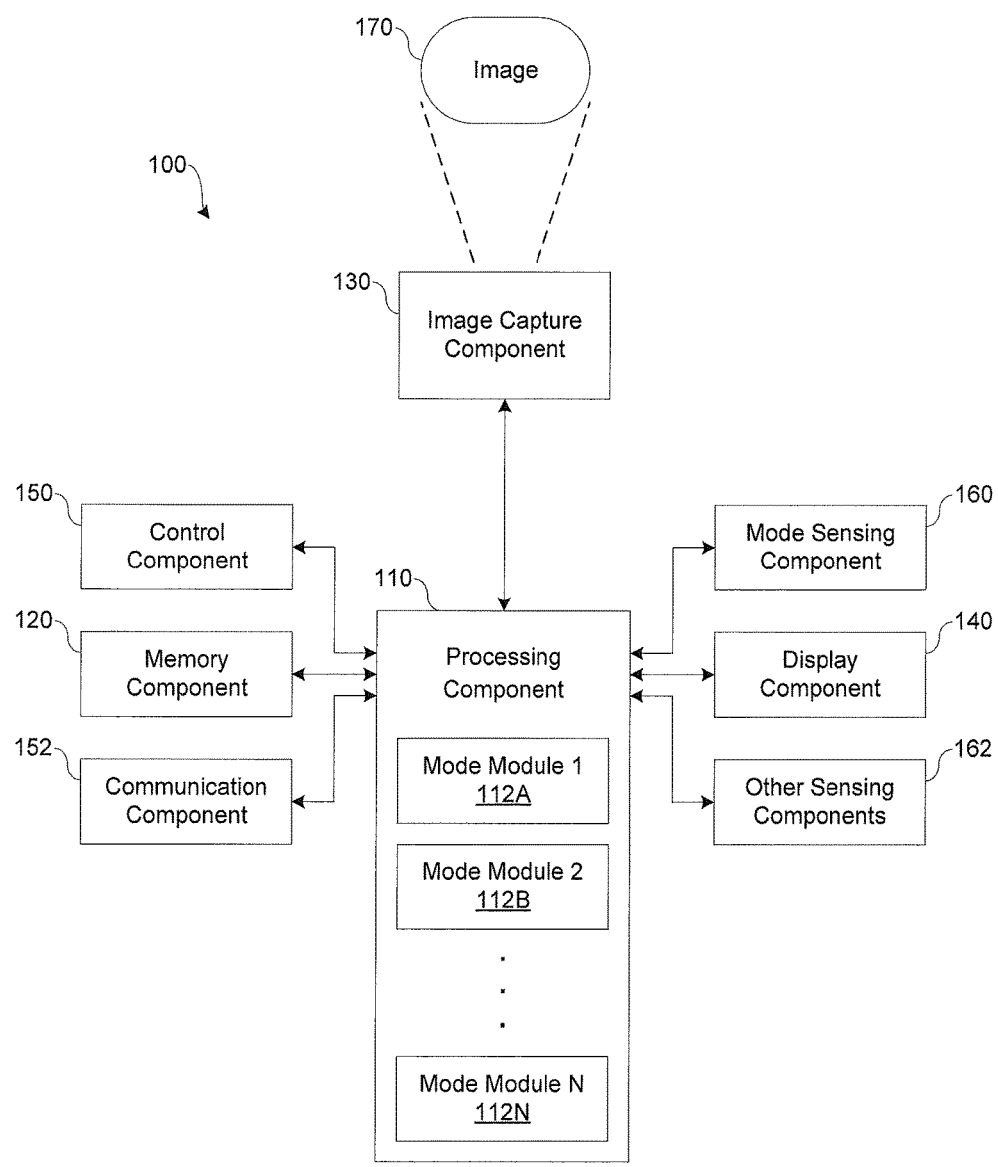
FIG. 1 shows a block diagram illustrating an infrared imaging system, in accordance with an embodiment.

FIG. 1 shows a block diagram illustrating an infrared imaging system 100 for capturing and processing infrared images in accordance with one or more embodiments. In one embodiment, infrared imaging system 100 includes a processing component 110, a memory component 120, an image capture component 130, a display component 140, a control component 150, and a mode sensing component 160. In another embodiment, infrared imaging system 100 may also include a communication component 152 and one or more other sensing components 162.

In various embodiments, infrared imaging system 100 may represent an infrared imaging device, such as an infrared camera, to capture images, such as image 170. Infrared imaging system 100 may represent any type of infrared camera system, which for example detects infrared radiation and provides representative data (e.g., one or more snapshots or video infrared images). For example, infrared imaging system 100 may represent an infrared camera that is directed to the near, middle, and/or far infrared spectrums to provide thermal infrared image data. Infrared imaging system 100 may include a portable device and may be implemented, for example, as a handheld device and/or coupled, in other examples, to various types of vehicles (e.g., a land-based vehicle, a watercraft, an aircraft, a spacecraft, etc.) or to various types of fixed locations (e.g., a home security mount, a campsite or outdoors mount, etc.) via one or more types of mounts. In still another example, infrared imaging system 100 may be integrated as part of a non-mobile installation requiring infrared images to be stored and/or displayed.

Processing component 110 includes, in one embodiment, a microprocessor, a single-core processor, a multi-core processor, a microcontroller, a logic device (e.g., a programmable logic device configured to perform processing functions), a digital signal processing (DSP) device, or some other type of generally known processor. Processing component 110 is adapted to interface and communicate with components 120, 130, 140, 150, 160, and 162 to perform method and processing steps as described herein. Processing component 110 may include one or more mode modules 112A-112N for operating in one or more modes of operation. In one aspect, mode modules 112A-112N are adapted to define preset processing and/or display functions that may be embedded in processing component 110 or stored on memory component 120 for access and execution by processing component 110. In another aspect, processing component 110 may be adapted to perform various types of image processing algorithms as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored by a separate computer-readable medium (e.g., a memory, such as a hard drive, a compact disk, a digital video disk, or a flash memory) to be executed by a computer (e.g., logic or processor-based system) to perform various methods disclosed herein.

In one example, the computer-readable medium may be portable and/or located separate from infrared imaging system 100, with stored mode modules 112A-112N provided to infrared imaging system 100 by coupling the computer-readable medium to infrared imaging system 100 and/or by infrared imaging system 100 downloading (e.g., via a wired or wireless link) the mode modules 112A-112N from the computer-readable medium (e.g., containing the non-transitory information). In various embodiments, as described herein, mode modules 112A-112N provide for improved infrared camera processing techniques for real time applications, wherein a user or operator may change the mode of operation depending on a particular application, such as a off-road application, a maritime application, an aircraft application, a space application, etc.

Memory component 120 includes, in one embodiment, one or more memory devices to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, etc. In one embodiment, processing component 110 is adapted to execute software stored in memory component 120 to perform various methods, processes, and modes of operations in manner as described herein.

Image capture component 130 includes, in one embodiment, one or more infrared sensors (e.g., any type of infrared detector, such as a focal plane array) for capturing infrared image signals representative of an image, such as image 170. In one embodiment, the infrared sensors of image capture component 130 provide for representing (e.g., converting) a captured image signal of image 170 as digital data (e.g., via an analog-to-digital converter included as part of the infrared sensor or separate from the infrared sensor as part of infrared imaging system 100). Processing component 110 may be adapted to receive infrared image signals from image capture component 130, process infrared image signals (e.g., to provide processed image data), store infrared image signals or image data in memory component 120, and/or retrieve stored infrared image signals from memory component 120. Processing component 110 may be adapted to process infrared image signals stored in memory component 120 to provide image data (e.g., captured and/or processed infrared image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information (e.g., infrared images). Display component 140 may receive image data and information directly from image capture component 130 via processing component 110, or the image data and information may be transferred from memory component 120 via processing component 110.

In one embodiment, processing component 110 may initially process a captured image and present a processed image in one mode, corresponding to mode modules 112A-112N, and then upon user input to control component 150, processing component 110 may switch the current mode to a different mode for viewing the processed image on display component 140 in the different mode. This switching may be referred to as applying the infrared camera processing techniques of mode modules 112A-112N for real time applications, wherein a user or operator may change the mode while viewing an image on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to function as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, etc.) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control functions of infrared imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, etc.), which are adapted to interface with a user and receive user input control signals via the display component 140. As an example for one or more embodiments as discussed further herein, display component 140 and control component 150 may represent a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, etc.), an electronic triggering mechanism (e.g., an electronic switch, push-button, electrical signal, electrical connection, etc.), an electro-mechanical triggering mechanism, an electro-magnetic triggering mechanism, or some combination thereof. For example for one or more embodiments, mode sensing component 160 senses a mode of operation corresponding to the infrared imaging system's 100 intended application based on the type of mount (e.g., accessory or fixture) to which a user has coupled the infrared imaging system 100 (e.g., image capture component 130). Alternatively, the mode of operation may be provided via control component 150 by a user of infrared imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, infrared imaging system 100 may be used in a freeform mode (e.g., handheld with no mount) and the default mode of operation may be set to handheld operation, with the infrared images provided wirelessly to a wireless display (e.g., another handheld device with a display, such as a smart phone, or to a vehicle's display).

Mode sensing component 160, in one embodiment, may include a mechanical locking mechanism adapted to secure the infrared imaging system 100 to a vehicle or part thereof and may include a sensor adapted to provide a sensing signal to processing component 110 when the infrared imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of infrared imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of infrared imaging system 100).

In various embodiments, mode sensing component 160 may be adapted to provide data and information relating to system application including a handheld implementation and/or coupling implementation associated with various types of vehicles (e.g., a land-based vehicle, a watercraft, an aircraft, a spacecraft, etc.) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, image capturing system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an affect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of image capturing system 100 may be combined and/or implemented or not, as desired or depending on application requirements, with image capturing system 100 representing various functional blocks of a system. For example, processing component 110 may be combined with memory component 120, image capture component 130, display component 140, and/or mode sensing component 160. In another example, processing component 110 may be combined with image capture component 130 with only certain functions of processing component 110 performed by circuitry (e.g., a processor, a microprocessor, a microcontroller, a logic device, etc.) within image capture component 130. In still another example, control component 150 may be combined with one or more other components or be remotely connected to at least one other component, such as processing component 110, via a wired or wireless control device so as to provide control signals thereto.

In one embodiment, image capturing system 100, may include a communication component 152, such as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the infrared imaging system 100 may be associated with a particular network link such as for example a URL (Uniform Resource Locator), an IP (Internet Protocol) address, and/or a mobile phone number.

Figure 2A:
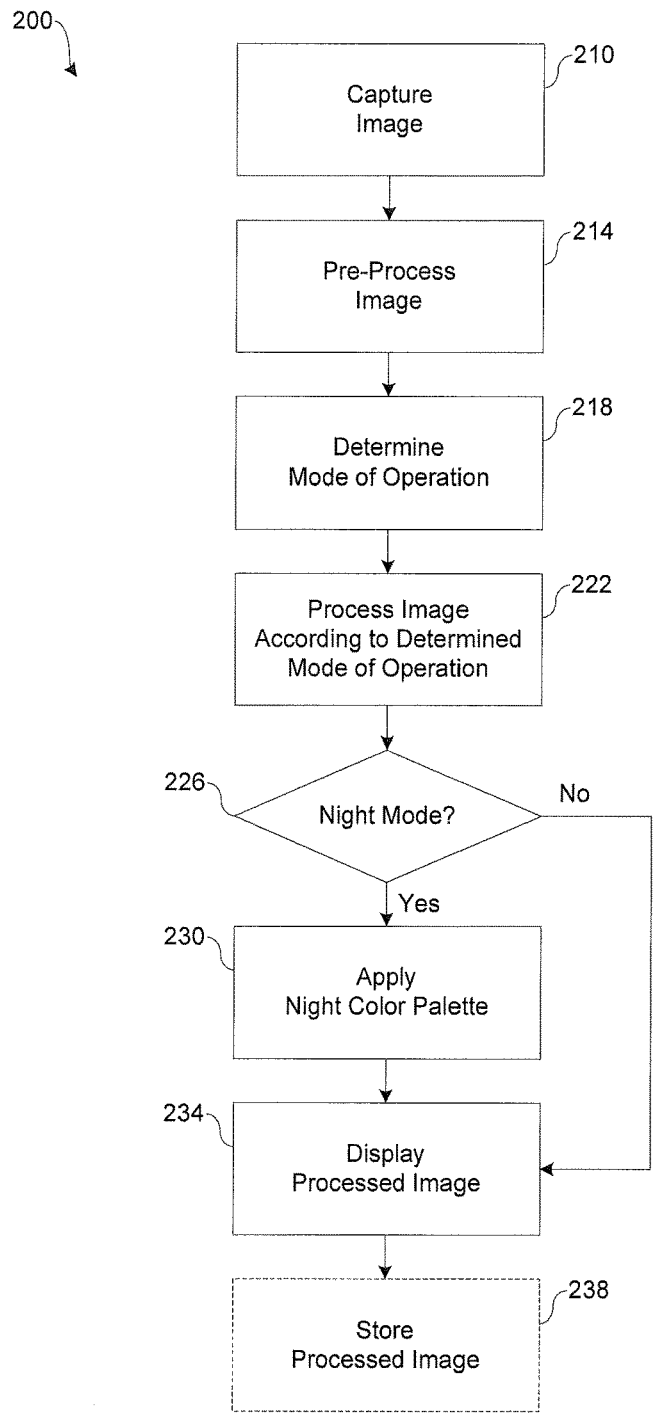
FIG. 2A shows a flowchart for capturing and processing infrared images, in accordance with an embodiment.

FIG. 2A shows a method 200 for capturing and processing infrared images, in accordance with one or more embodiments. For purposes of simplifying discussion of FIG. 2A, reference may be made to image capturing system 100 of FIG. 1 as an example of a system, device, or apparatus that may perform method 200.

Referring to FIG. 2A, an image (e.g., infrared image signal containing infrared image data) is captured (block 210) with infrared imaging system 100. In one embodiment, processing component 110 controls (e.g., causes) image capture component 130 to capture an image, such as, for example, image 170. In one aspect, after receiving the captured image from image capture component 130, processing component 110 may be adapted to optionally store the captured image in memory component 120 for processing.

The captured image may be pre-processed (block 214). In one embodiment, pre-processing may include obtaining infrared sensor data related to the captured image, applying correction terms, and applying noise reduction techniques to improve image quality prior to further processing as would be understood by one skilled in the art. In another embodiment, processing component 110 may directly pre-process the captured image or optionally retrieve the captured image stored in memory component 120 and then pre-process the image. In one aspect, pre-processed images may be optionally stored in memory component 120 for further processing.

A mode of operation may be determined (block 218) and in one or more embodiments, the mode of operation may be determined before or after the image is captured and pre-processed (blocks 210 and 214), depending upon the types of infrared detector settings (e.g., biasing, frame rate, signal levels, etc.), processing algorithms, and related configurations, as would be understood by one skilled in the art. In one embodiment, a mode of operation may be defined by mode sensing component 160, wherein an application sensing portion of mode sensing component 160 may be adapted to automatically sense the mode of operation, and depending on the sensed application, mode sensing component 160 may be adapted to provide related data and/or information to processing component 110. In another embodiment, it should be appreciated that the mode of operation may be manually set by a user via display component 140 and/or control component 150 without departing from the scope of the present disclosure. As such, in one aspect, processing component 110 may communicate with display component 140 and/or control component 150 to obtain the mode of operation as provided (e.g., input) by a user. In another embodiment, as described further herein, a default mode of operation may be provided (e.g., when no mount is sensed or no user selection provided). As described herein, the modes of operation may include the use of one or more infrared image processing algorithms and/or image processing techniques.

In various embodiments, the modes of operation refer to processing and/or display functions of an infrared image, wherein for example an infrared imaging system is adapted to process infrared sensor data prior to displaying the data to a user. In some embodiments, infrared image processing algorithms are utilized to present an image under a variety of conditions, and the infrared image processing algorithms provide the user with one or more options to tune parameters and operate the infrared imaging system in an automatic mode or a manual mode. In various aspects, the modes of operation are provided by infrared imaging system 100, and the concept of image processing for different use conditions may be implemented in various types of vehicle applications and resulting use conditions, such as, for example, land based applications, maritime applications, air flight applications, and space applications.

As shown in FIG. 2A, the image is processed according to the determined mode of operation (block 222). For example for an embodiment, a vehicle roof application may be implemented, such as being mounted to cargo framework (e.g., a roof rack), and the image may be processed to provide a basic monochrome display with optimal automatic gain control (AGC) parameters selected, pedestrian detection enabled, and with the information provided to a remote video display (e.g., within the vehicle via a wireless or wired connection). In one or more embodiments, rather than a vehicle roof application, the infrared imaging system (e.g., at least a portion of the infrared imaging system) may be implemented in a vehicle hard mount application, such as being mounted to a rigid part of a vehicle (e.g., to or within a bumper, a fender, or a dashboard), with the image processed in a similar fashion as the vehicle roof application.

In another embodiment, a cycle application may be implemented, such as being mounted to handlebars or a front portion of the cycle (e.g., fender, forks, or other part of a bicycle, motorcycle, or other two-to-four wheeled small, rideable vehicle), and the image may be processed in a similar fashion as the vehicle roof application. Furthermore for one or more embodiments, an animal and/or pedestrian alert processing may be enabled, as would be understood by one skilled in the art, such that the infrared image data is processed and algorithms are used to analyze the data for an animal, pedestrian, or other object that may require an alert provided to a user or other action taken. For example, the animal and/or pedestrian alert processing may be implemented using commercially available software and implemented for any vehicle application (e.g., the vehicle roof application, the vehicle hard mount application, or the cycle application).

In another embodiment, a maritime hard mount application may be implemented, such as being mounted to a rigid part of a watercraft (e.g., to the front or other portion of a boat), and the image may be processed according to various maritime mode processing techniques. As an example, the processing may provide a red hue display (i.e., to minimize degradation to a user's night vision), with maritime AGC selections and other parameter settings and with the information provided to a remote video display (e.g., within the vehicle via a wireless or wired connection, such as to a maritime controller). Furthermore for an embodiment, the maritime hard mount application processing may be applied to a maritime pan/tilt application (e.g., pan/tilt accessory hard mounted to a watercraft) and with pan/tilt position information (e.g., data and controls) enabled.

In another embodiment, a handheld binocular may be implemented, such as a handheld binocular optimized for marine applications, land-based applications, or other applications as would be understood by one skilled in the art. For example for marine applications, the image may be processed in a similar fashion as for the maritime hard mount or pan/tilt application, while for land applications the image may be processed in a similar fashion as one of the vehicle applications.

In another embodiment, a home maintenance application may be implemented, such as a handheld tool attachment with a display, and the image may be processed for this application. For example, the home maintenance application may provide a selection between monochrome and color modes and various isotherms, an absolute temperature readout, and image capture capability.

In another embodiment, a handheld application may be implemented for various uses, such as being a handheld device for various sporting and camping activities, and the image may be processed accordingly. For example, the handheld application may provide a monochrome display, a terrestrial AGC mode, image capture enabled, and utilize a low power mode of operation such as by disabling a shutter (e.g., utilize an external shutter capability). The handheld application may also provide image processing in a similar fashion as for the handheld binocular application as would be understood by one skilled in the art.

In another embodiment, a head-mounted application (e.g., attached to a helmet, a head strap, or to glasses) may be implemented for various activities (e.g., walking, hiking, or cycling), with the images processed and displayed on an associated display (e.g., handheld or mounted to the cycle) or on a small display associated with the head mount (e.g., suspended from the helmet or head strap or incorporated into the lens of the glasses. For example, the head-mounted application may provide a selection between monochrome and color modes and various isotherms, an absolute temperature readout, and image capture capability. As another example, the head-mounted application may process the images in a similar fashion as the handheld application, the handheld binocular application (e.g., if the head-mounted application provides stereo capability via two infrared detectors within image capture component 130), or other desired modes.

In another embodiment, an aircraft application may be implemented, such as being mounted to a rigid part of an aircraft, and the image may be processed according to various aircraft mode processing techniques. As an example, the processing may provide a red hue display (i.e., to minimize degradation to a user's night vision), with aircraft AGC selections and other parameter settings and with the information provided to a remote video display (e.g., within the aircraft via a wireless or wired connection, such as to an aircraft controller). Furthermore for an embodiment, the aircraft application processing may be applied to an aircraft pan/tilt application (e.g., pan/tilt accessory hard mounted to the aircraft) and with pan/tilt position information (e.g., data and controls) enabled.

It should be understood that the various applications are exemplary applications and are not limiting, as would be understood by one skilled in the art, and represent various examples of modes of operation that may be determined and implemented by the infrared camera (e.g., infrared imaging system 100). For example for one or more embodiments, the infrared camera may determine the mode of operation based on the type of infrared camera mount being used (e.g., mechanical and/or electrical connections) and/or by the type of electrical signals provided to the infrared camera (e.g., signal types or signals provided on certain connection pins). As a specific example, the infrared camera may be modular and configurable such that a user may easily attach the infrared camera to various types of mounts (e.g., accessories) and, depending upon the mount, the infrared camera would configure itself for the desired application associated with the mount and process the images accordingly.

Alternatively or in addition for one or more embodiments, the user may manually select the desired application from a menu list of applications to place the infrared camera in a desired mode of operation. Furthermore as an example for an embodiment, a user selected mode (or application configuration) may be maintained by the infrared camera (regardless of the type of mount attached) until the modular infrared camera is removed and attached to a different mount, the user selects a different mode, and/or the user resets the infrared camera such that the mode is determined by the type of mount attached.

Additionally for one or more embodiments, a default mode of operation may be provided, which may be used, for example, if no particular type of mount is determined and no user selection is provided. For example, the modular infrared camera may be held by a user or placed at a desired location (e.g., in a freeform of use) without a mount used, with the infrared images provided to a separate device (e.g., wirelessly) for storing and/or displaying the infrared images. The mode of operation may be automatically set by the modular infrared camera to the default mode, which for example may be set to the same settings as for the handheld application (e.g., as described herein) or to some other desired default settings implemented. The separate device and the modular infrared camera may link wirelessly, for example, as would be understood by one skilled in the art according to the specific, particular wireless standard implemented (e.g., Bluetooth®, Wi-Fi®, or other wireless standards).

After the mode of operation is determined (block 218), the images may then be processed and displayed (block 234) and/or stored (block 238, i.e., after processing or prior to processing). Additionally, further processing may optionally be performed.

For example for an embodiment, a determination may be made as to whether to display the processed image in a night mode (block 226). If yes, then processing component 110 configures display component 140 to apply a night color palette to the processed image (block 230), and the processed image is displayed in night mode (block 234). In night mode, an image may be displayed in a red palette or a green palette to improve night vision capacity (e.g., to minimize night vision degradation) for a user. Otherwise, if night mode is not considered necessary (block 226), then the processed image is displayed in a non-night mode manner (e.g., black hot or white hot palette) (block 234).

In one aspect, processing component 110 may optionally store the processed image in memory component 120 (block 238). In another aspect, processing component 110 may, at any time, retrieve the processed image stored in memory component 120 and display the processed image on display component 150 for viewing by a user.

In various embodiments, the night mode of displaying images refers to using a red color palette or green color palette to assist the user or operator in the dark when adjusting to low light conditions. During night operation of image capturing system 100, human visual capacity to see in the dark may be impaired by the blinding effect of a bright image on a display monitor. Hence, the night mode changes the color palette from a standard black hot or white hot palette to a red or green color palette display. Generally, the red or green color palette is known to interfere less with human night vision capability. In one example, for a red-green-blue (RGB) type of display, the green and blue pixels may be disabled to boost red color for a red color palette. In one aspect, the night mode display may be combined with any other mode of operation of infrared imaging system 100, and a default display mode of infrared imaging system 100 at night may be the night mode display.

In various embodiments, processing component 110 may switch the processing mode of a captured image in real time and change the displayed processed image from one mode, corresponding to mode modules 112A-112N, to a different mode upon receiving input from mode sensing component 160 and/or user input from control component 150. As such, processing component 110 may switch a current mode of display to another different mode of display for viewing the processed image by the user or operator on display component 140 depending on the input received from mode sensing component 160 and/or user input from control component 150. This switching may be referred to as applying the infrared camera processing techniques of mode modules 112A-112N for real time applications, wherein the displayed mode may be switched while viewing an image on display component 140 based on the input received from mode sensing component 160 and/or user input received from control component 150.

Figure 2B:
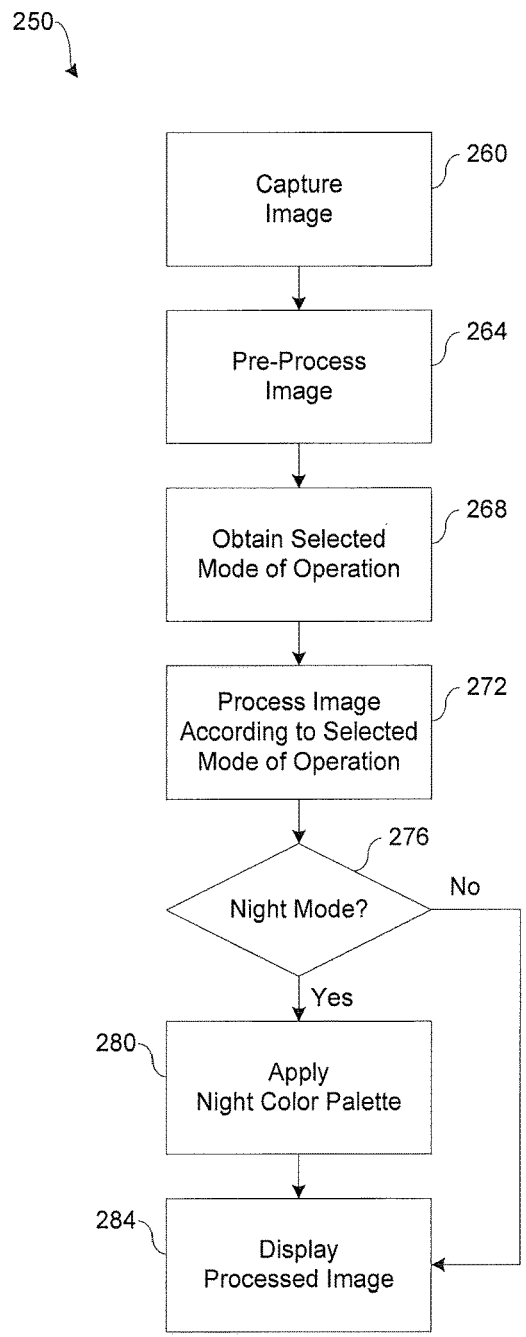
FIG. 2B shows a block diagram illustrating a method for capturing and processing infrared images in accordance with an embodiment.

FIG. 2B shows a method 250 for capturing and processing infrared images in accordance with an embodiment. For purposes of simplifying discussion of FIG. 2B, reference may be made to infrared imaging system 100 of FIG. 1 as an example of a system, device or apparatus that may perform method 250. It should also be understood that method 250 may be applied, for example for one or more embodiments, as a maritime mode of operation in the event that a maritime application is determined as the intended application (or use) of infrared imaging system 100. Thus, method 250 may operate in conjunction with method 200 or substituted for method 200 and various steps may be combined as appropriate.

Referring to FIG. 2B, an image (e.g., infrared image signal) is captured (block 260) with infrared imaging system 100. In one embodiment, processing component 110 induces (e.g., causes) image capture component 130 to capture an image, such as, for example, image 170. After receiving the captured image from image capture component 130, processing component 110 may optionally store the captured image in memory component 120 for processing.

The captured image may optionally be pre-processed (block 264). In one embodiment, pre-processing may include obtaining infrared sensor data related to the captured image, applying correction terms, and/or applying temporal noise reduction to improve image quality prior to further processing. In another embodiment, processing component 110 may directly pre-process the captured image or optionally retrieve the captured image stored in memory component 120 and then pre-process the image. Pre-processed images may be optionally stored in memory component 120 for further processing.

Figure 5:
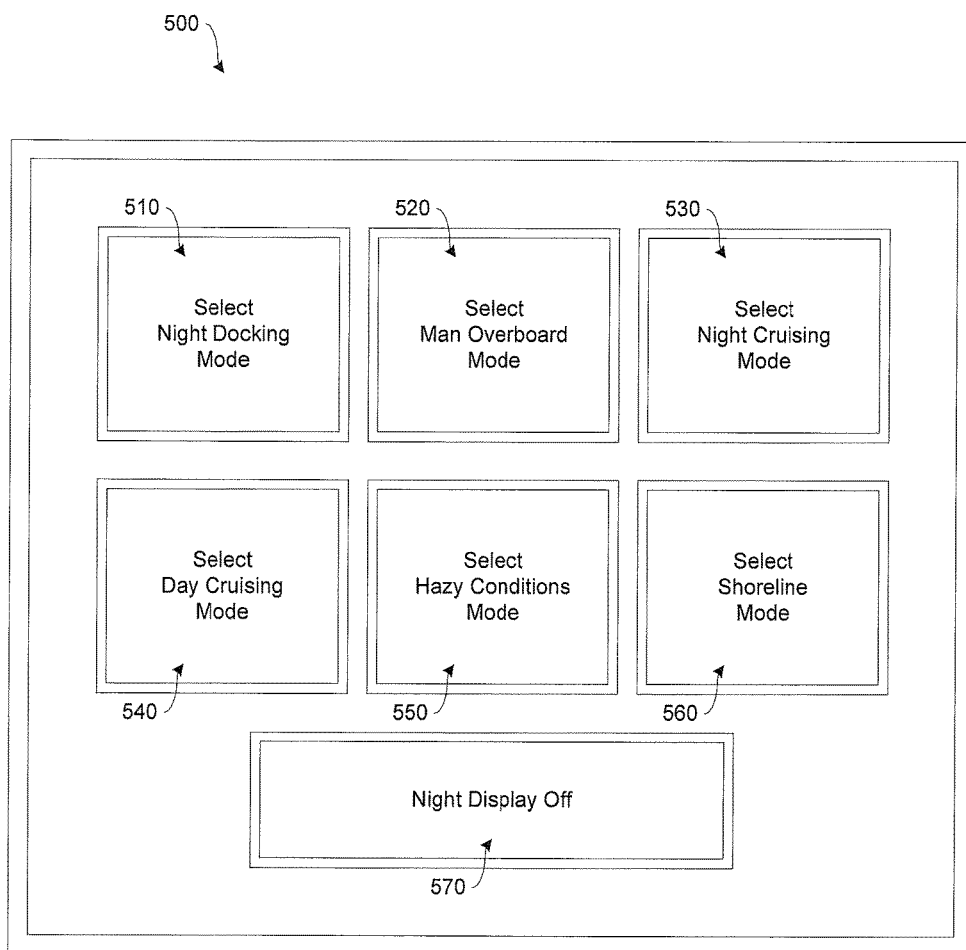
FIG. 5 shows a block diagram illustrating a control component of the infrared imaging system for selecting between different modes of operation in accordance with an embodiment.

A user selected mode of operation (e.g., as discussed in reference to FIG. 2A), a default mode of operation (e.g., as discussed in reference to FIG. 2A), and/or a maritime mode of operation may be obtained (block 268). In one embodiment, the selected maritime mode of operation may comprise a user input control signal that may be obtained or received from control component 150 (FIG. 1, e.g., control panel unit 500 of FIG. 5). In various embodiments, the selected maritime mode of operation may be selected from at least one of night docking, man overboard, night cruising, day cruising, hazy conditions, and shoreline mode. As such, processing component 110 may communicate with control component 150 to obtain the selected maritime mode of operation as input by a user. These modes of operation are described in greater detail herein and may include the use of one or more infrared image processing algorithms.

In one or more embodiments, mode of operation, including maritime mode of operation, refer to preset settings, processing, and/or display functions for an infrared image, and infrared imagers and infrared cameras are adapted to capture and process infrared sensor data prior to displaying the data to a user. In general, display algorithms attempt to present the scene (i.e., field of view) information in an effective way to the user. In some cases, infrared image processing algorithms are utilized to present a good image under a variety of conditions, and the infrared image processing algorithms provide the user with one or more options to tune parameters and run the camera in "manual mode". In one aspect, infrared imaging system 100 may be simplified by hiding advanced manual settings. In another aspect, the concept of preset image processing for different conditions may be implemented in maritime applications.

As shown in FIG. 2B, the image is processed in accordance with the selected maritime mode of operation (block 272), in a manner as described in greater detail herein. In one embodiment, processing component 110 may store the processed image in memory component 120 for displaying. In another embodiment, processing component 110 may retrieve the processed image stored in memory component 120 and display the processed image on display component 150 for viewing by a user.

A determination is made as to whether to display the processed image in a night mode (block 276), in a manner as described in greater detail herein. If yes, then processing component 110 configures display component 140 to apply a night color palette to the processed image (block 280), and the processed image is displayed in night mode (block 284). For example, in night mode (e.g., for night docking, night cruising, or other modes when operating at night), an image may be displayed in a red palette or green palette to improve night vision capacity for a user. Otherwise, if night mode is not necessary, then the processed image is displayed in a non-night mode manner (e.g., black hot or white hot palette) (block 284).

Furthermore in various embodiments, certain image features may be appropriately marked (e.g., color-indicated or colorized, highlighted, or identified with other indicia), such as during the image processing (block 272) or displaying of the processed image (block 284), to aid a user to identify these features while viewing the displayed image. For example, as discussed further herein, during a man overboard mode, a suspected person (e.g., or other warm-bodied animal or object) may be indicated in the displayed image with a blue color (or other color or type of marking) relative to the black and white palette or night color palette (e.g., red palette). As another example, as discussed further herein, during a night time or daytime cruising mode and/or hazy conditions mode, potential hazards in the water may be indicated in the displayed image with a yellow color (or other color or type of marking) to aid a user viewing the display. It should be appreciated that further details regarding image colorization may be found, for example, in U.S. Pat. No. 6,849,849, which is incorporated herein by reference in its entirety.

In various embodiments, processing component 110 may switch the processing mode of a captured image in real time and change the displayed processed image from one maritime mode, corresponding to mode modules 112A-112N, to a different maritime mode upon receiving user input from control component 150. As such, processing component 110 may switch a current mode of display to a different mode of display for viewing the processed image by the user or operator on display component 140. This switching may be referred to as applying the infrared camera processing techniques of mode modules 112A-112N for real time applications, wherein a user or operator may change the displayed mode while viewing an image on display component 140 based on user input to control component 150.

FIGS. 3A-3E show block diagrams illustrating infrared processing techniques in accordance with various embodiments. As described herein, infrared imaging system 100 is adapted to switch between different maritime modes of operation so as to improve the infrared images and information provided to a user or operator.

Figures 3A, 3B:
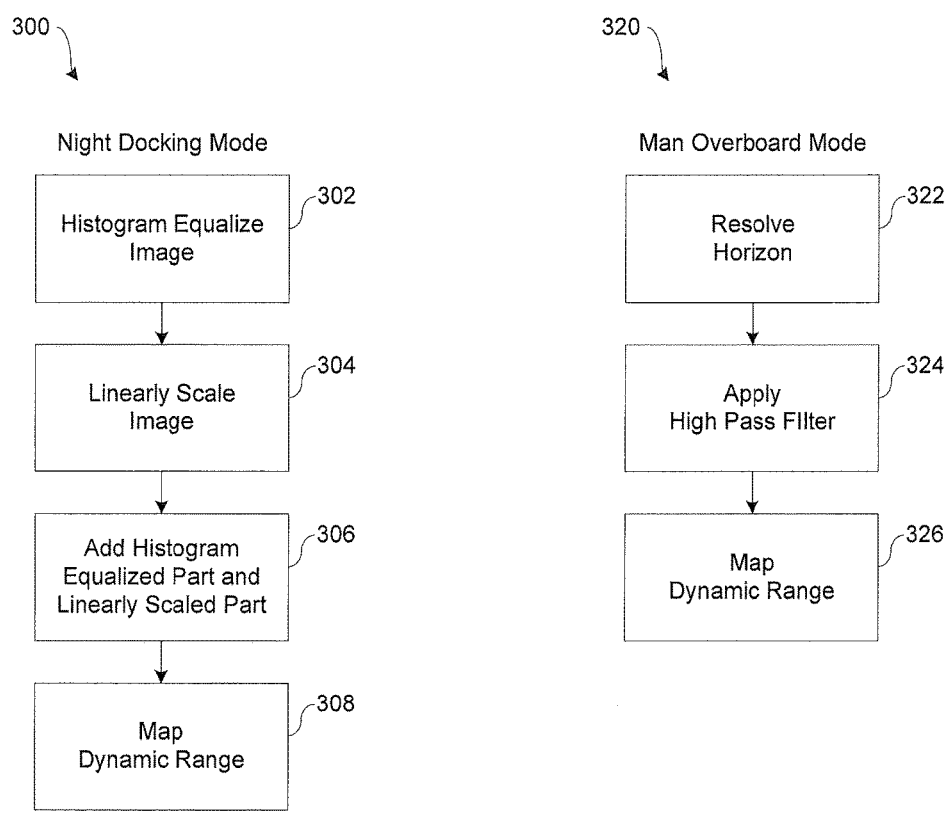
FIGS. 3A-3F show block diagrams illustrating infrared processing techniques in accordance with one or more embodiments.

FIG. 3A shows one embodiment of an infrared processing technique 300 as described in reference to block 272 of FIG. 2B. In one embodiment, the infrared processing technique 300 comprises a night docking mode of operation for maritime applications. For example, during night docking, a watercraft or sea vessel is in the vicinity of a harbor, jetty, or marina, which have proximate structures including piers, buoys, other watercraft, or other structures on land. A thermal infrared imager (e.g., infrared imaging system 100) may be used as a navigational tool in finding a correct docking spot. The infrared imaging system 100 produces an infrared image that assists the user or operator in docking the watercraft. There is a high likelihood of hotspots in the image, such as dock lights, vents and running motors, which may have a minimal impact on how the scene is displayed.

Referring to FIG. 3A, the input image is histogram equalized and scaled (e.g., 0-511) to form a histogram equalized part (block 302). Next, the input image is linearly scaled (e.g., 0-128) while saturating the highest and lowest (e.g., 1%) to form a linearly scaled part (block 304). Next, the histogram-equalized part and the linearly scaled part are added together to form an output image (block 306). Next, the dynamic range of the output image is linearly mapped to fit the display component 140 (block 308). It should be appreciated that the block order in which the process 300 is executed may be executed in a different order without departing from the scope of the present disclosure.

In one embodiment, the night docking mode is intended for image settings with large amounts of thermal clutter, such as a harbor, a port, or an anchorage. The settings may allow the user to view the scene without blooming on hot objects. Hence, infrared processing technique 300 for the night docking mode is useful for situational awareness in maritime applications when, for example, docking a watercraft with low visibility.

In various embodiments, during processing of an image when the night docking mode is selected, the image is histogram equalized to compress the dynamic range by removing "holes" in the histogram. The histogram may be plateau limited so that large uniform areas, such as sky or water components, are not given too much contrast. For example, approximately 20% of the dynamic range of the output image may be preserved for a straight linear mapping of the non-histogram equalized image. In the linear mapping, for example, the lowest 1% of the pixel values are mapped to zero and the highest 1% of the input pixels are mapped to a maximum value of the display range (e.g., 280). In one aspect, the final output image becomes a weighted sum of the histogram equalized and linearly (with 1% "outlier" cropping) mapped images.

FIG. 3B shows one embodiment of an infrared processing technique 320 as described in reference to block 272 of FIG. 2B. In one embodiment, the infrared processing technique 320 comprises a man overboard mode of operation for maritime applications. For example, in the man overboard mode, image capturing system 100 may be tuned to the specific task of finding a person in the water. The distance between the person in the water and the watercraft may not be known, and the person may be only a few pixels in diameter or significantly larger if lying close to the watercraft. In one aspect, even t a person may be close to the watercraft, the person may have enough thermal signature to be clearly visible, and thus the man overboard display mode may target the case where the person has weak thermal contrast and is far enough away so as to not be clearly visible without the aid of image capturing system 100.

Referring to FIG. 3B, image capture component 130 (e.g., infrared camera) of image capturing system 100 is positioned to resolve or identify the horizon (block 322). In one embodiment, the infrared camera is moved so that the horizon is at an upper part of the field of view (FoV). In another embodiment, the shoreline may also be indicated along with the horizon. Next, a high pass filter (HPF) is applied to the image to form an output image (block 324). Next, the dynamic range of the output image is linearly mapped to fit the display component 140 (block 326). It should be appreciated that the block order in which the process 320 is executed may be executed in a different order without departing from the scope of the present disclosure.

In one example, horizon identification may include shoreline identification, and the horizon and/or shoreline may be indicated by a line (e.g., a red line or other indicia) superimposed on a thermal image along the horizon and/or the shoreline, which may be useful for user or operators to determine position of the watercraft in relation to the shoreline. Horizon and/or shoreline identification may be accomplished by utilizing a real-time Hough transform or other equivalent type of transform applied to the image stream, wherein this image processing transform finds linear regions (e.g., lines) in an image. The real-time Hough transform may also be used to find the horizon and/or shoreline in open ocean when, for example, the contrast may be low. Under clear conditions, the horizon and/or shoreline may be easy identified. However, on a hazy day, the horizon and/or shoreline may be difficult to locate.

In general, knowing where the horizon and/or shoreline are is useful for situational awareness. As such, in various embodiments, the Hough transform may be allied to any of the maritime modes of operation described herein to identify the horizon and/or shoreline in an image. For example, the shoreline identification (e.g., horizon and/or shoreline) may be included along with any of the processing modes to provide a line (e.g., any type of marker, such as a red line or other indicia) on the displayed image and/or the information may be used to position the infrared camera's field of view.

In one embodiment of the man overboard mode, signal gain may be increased to bring out minute temperature differences of the ocean, such as encountered when looking for a hypothermic body in a uniform ocean temperature that may be close to the person's body temperature. Image quality is traded for the ability to detect small temperature changes when comparing a human body to ocean temperature. Thus, infrared processing technique 320 for the man overboard mode is useful for situational awareness in maritime applications when, for example, searching for a man overboard proximate to the watercraft.

In various embodiments, during processing of an image when the man overboard mode is selected, a high pass filter is applied to the image. For example, the signal from the convolution of the image by a Gaussian kernel may be subtracted. The remaining high pass information is linearly stretched to fit the display range, which may increase the contrast of any small object in the water. In one enhancement of the man overboard mode, objects in the water may be marked, and the system signals the watercraft to direct a searchlight at the object. For systems with both visible and thermal imagers, the thermal imager is displayed. For zoom or multi-FoV systems, the system is set in a wide FoV. For pan-tilt controlled systems with stored elevation settings for the horizon, the system is moved so that the horizon is visible just below the upper limit of the field of view.

In one embodiment, the man overboard mode may activate a locate procedure to identify an area of interest, zoom-in on the area of interest, and position a searchlight on the area of interest. For example, the man overboard mode may activate a locate procedure to identify a position of a object (e.g., a person) in the water, zoom-in the infrared imaging device (e.g., an infrared camera) on the identified object in the water, and then point a searchlight on the identified object in the water. In various embodiments, these actions may be added to process 250 of FIG. 2B and/or process 320 of FIG. 3B and further be adapted to occur automatically so that the area of interest and/or location of the object of interest may be quickly identified and retrieved by a crew member.

Figures 3C, 3D:
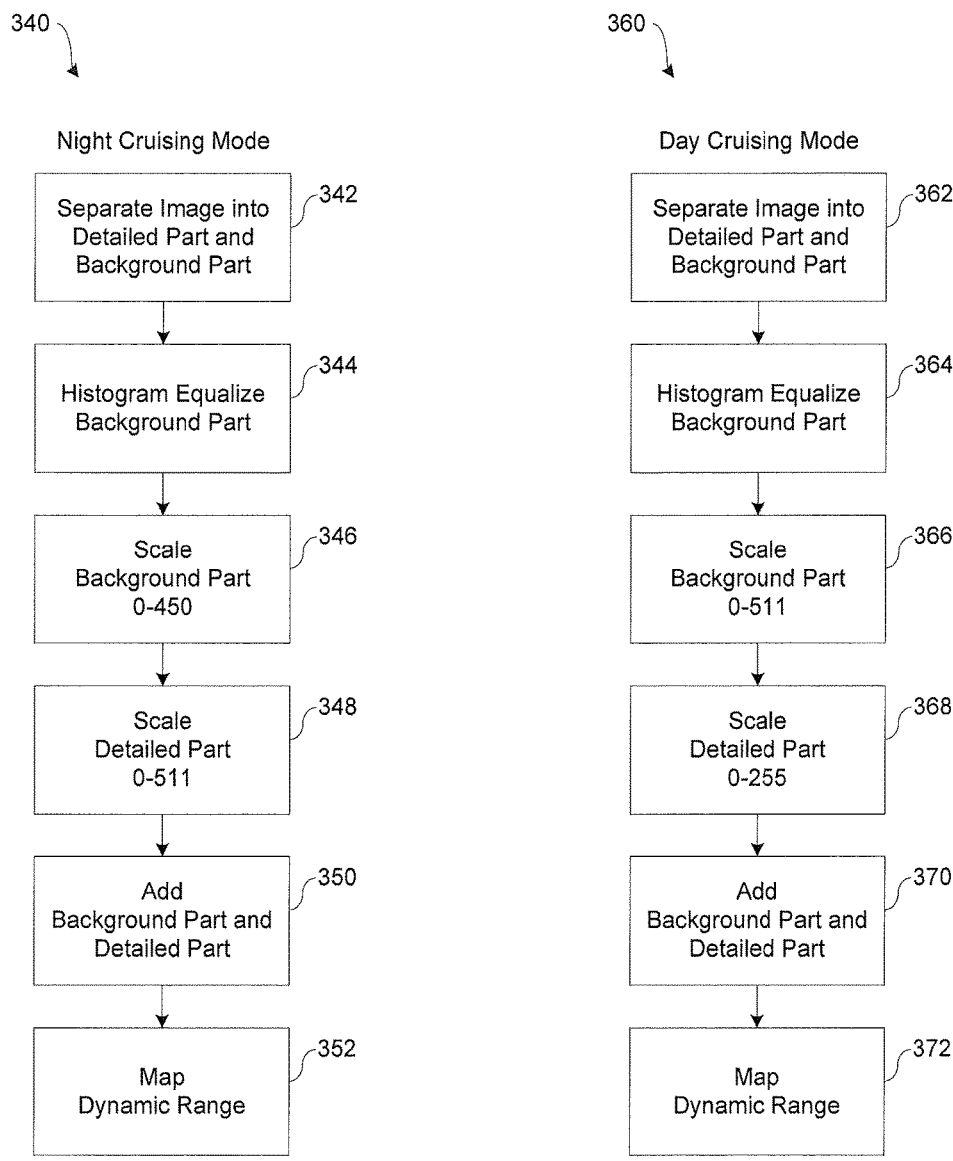

FIG. 3C shows one embodiment of an infrared processing technique 340 as described in reference to block 272 of FIG. 2B. In one embodiment, the infrared processing technique 340 comprises a night cruising mode of operation for maritime applications. For example, during night cruising, the visible channel has limited use for other than artificially illuminated objects, such as other watercraft. The thermal infrared imager may be used to penetrate the darkness and assist in the identification of buoys, rocks, other watercraft, islands and structures on shore. The thermal infrared imager may also find semi-submerged obstacles that potentially lie directly in the course of the watercraft. In the night cruising mode, the display algorithm may be tuned to find objects in the water without distorting the scene (i.e., field of view) to the extent that it becomes useless for navigation.

In one embodiment, the night cruising mode is intended for low contrast situations encountered on an open ocean. The scene (i.e., field of view) may be filled with a uniform temperature ocean, and any navigational aids or floating debris may sharply contrast with the uniform temperature of the ocean. Therefore, infrared processing technique 340 for the night cruising mode is useful for situational awareness in, for example, open ocean.

Referring to FIG. 3C, the image is separated into a background image part and a detailed image part (block 342). Next, the background image part is histogram equalized (block 344) and scaled (e.g., 0-450) (block 346). Next, the detailed image part is scaled (e.g., 0-511) (block 348). Next, the histogram-equalized background image part and the scaled detailed image part are added together to form an output image (block 350). Next, the dynamic range of the output image is linearly mapped to fit the display component 140 (block 352). It should be appreciated that the block order in which the process 340 is executed may be executed in a different order without departing from the scope of the present disclosure.

In various embodiments, during processing of an image when the night cruising mode is selected, the input image is split into detailed and background image components using a non-linear edge preserving low pass filter (LPF), such as a median filter or by anisotropic diffusion. The background image component comprises a low pass component, and the detailed image part is extracted by subtracting the background image part from the input image. To enhance the contrast of small and potentially weak objects, the detailed and background image components may be scaled so that the details are given approximately 60% of the output/display dynamic range. In one enhancement of the night cruising mode, objects in the water are tracked, and if they are on direct collision course as the current watercraft course, they are marked in the image, and an audible alarm may be sounded. For systems with both visible and thermal imager, the thermal imager may be displayed by default.

In one embodiment, a first part of the image signal may include a background image part comprising a low spatial frequency high amplitude portion of an image. In one example, a low pass filter (e.g., low pass filter algorithm) may be utilized to isolate the low spatial frequency high amplitude portion of the image signal (e.g., infrared image signal). In another embodiment, a second part of the image signal may include a detailed image part comprising a high spatial frequency low amplitude portion of an image. In one example, a high pass filter (e.g., high pass filter algorithm) may be utilized to isolate the high spatial frequency low amplitude portion of the image signal (e.g., infrared image signal). Alternately, the second part may be derived from the image signal and the first part of the image signal, such as by subtracting the first part from the image signal.

In general for example, the two image parts (e.g., first and second parts) of the image signal may be separately scaled before merging the two image parts to produce an output image. For example, the first or second parts may be scaled or both the first and second parts may be scaled. In one aspect, this may allow the system to output an image where fine details are visible and tunable even in a high dynamic range scene. In some instances, as an example, if an image appears less useful or degraded by some degree due to noise, then one of the parts of the image, such as the detailed part, may be suppressed rather than amplified to suppress the noise in the merged image to improve image quality.

FIG. 3D shows one embodiment of an infrared processing technique 360 as described in reference to block 272 of FIG. 2B. In one embodiment, the infrared processing technique 360 comprises a day cruising mode of operation for maritime applications. For example, during day cruising, the user or operator may rely on human vision for orientation immediately around the watercraft. Image capturing system 100 may be used to zoom in on objects of interest, which may involve reading the names of other watercraft, and searching for buoys, structures on land, etc.

Referring to FIG. 3D, the image is separated into a background image part and a detailed image part (block 362). Next, the background image part is histogram equalized (block 364) and scaled (e.g., 0-511) (block 366). Next, the detailed image part is scaled 0-255 (block 368). Next, the histogram-equalized background image part and the scaled detailed image part are added together to form an output image (block 370). Next, the dynamic range of the output image is linearly mapped to fit the display component 140 (block 372). It should be appreciated that the block order in which the process 360 is executed may be executed in a different order without departing from the scope of the present disclosure.

In one embodiment, the day cruising mode is intended for higher contrast situations, such as when solar heating leads to greater temperature differences between unsubmerged or partially submerged objects and the ocean temperature. Hence, infrared processing technique 360 for the day cruising mode is useful for situational awareness in, for example, high contrast situations in maritime applications.

In various embodiments, during processing of an image when the day cruising mode is selected, the input image is split into its detailed and background components respectively using a non-linear edge preserving low pass filter, such as a median filter or by anisotropic diffusion. For color images, this operation may be achieved on the intensity part of the image (e.g., Y in a YCrCb format). The background image part comprises the low pass component, and the detailed image part may be extracted by subtracting the background image part from the input image. To enhance the contrast of small and potentially weak objects, the detailed and background image parts may be scaled so that the details are given approximately 35% of the output/display dynamic range. For systems with both visible and thermal imagers the visible image may be displayed by default.

Figures 3E, 3F:
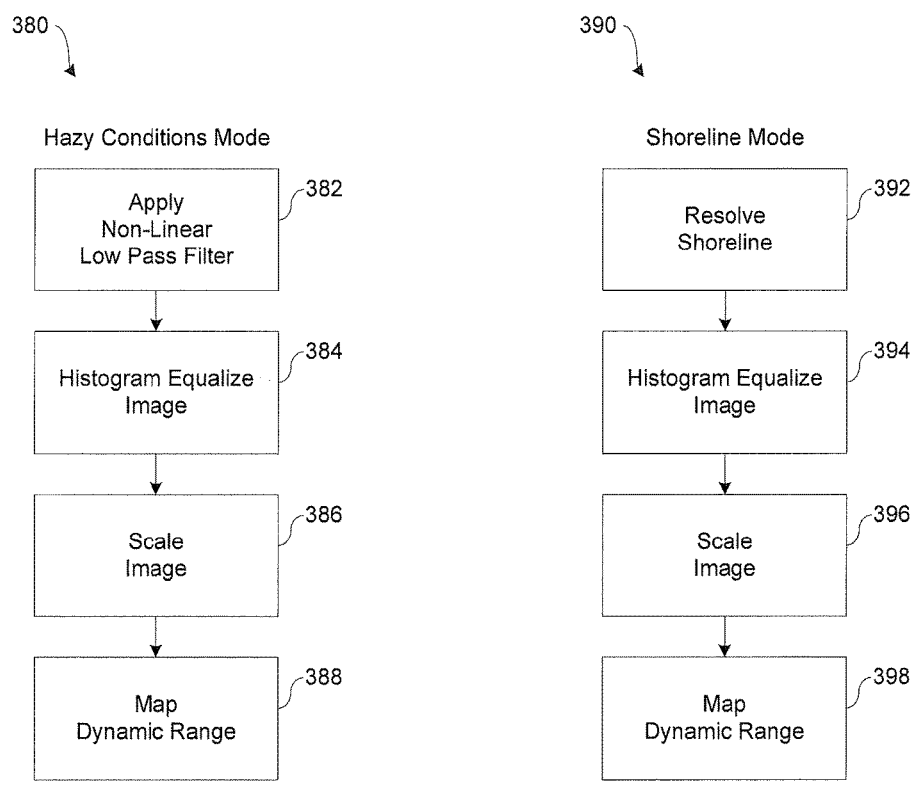

FIG. 3E shows one embodiment of an infrared processing technique 380 as described in reference to block 272 of FIG. 2B. In one embodiment, the infrared processing technique 380 comprises a hazy conditions mode of operation for maritime applications. For example, even during daytime operation, a user or operator may achieve better performance from an imager using an infrared (MWIR, LWIR) or near infrared (NIR) wave band. Depending on vapor content and particle size, a thermal infrared imager may significantly improve visibility under hazy conditions. If neither the visible nor the thermal imagers penetrate the haze, image capturing system 100 may be set in hazy conditions mode under which system 100 attempts to extract what little information is available from the chosen infrared sensor. Under hazy conditions, there may be little high spatial frequency information (e.g., mainly due, in one aspect, to scattering by particles). The information in the image may be obtained from the low frequency part of the image, and boosting the higher frequencies may drown the image in noise (e.g., temporal and/or fixed pattern).

Referring to FIG. 3E, a non-linear edge preserving low pass filter (LPF) is applied to the image (block 382). Next, the image is histogram equalized (block 384) and scaled (block 386) to form a histogram equalized output image. Next, the dynamic range of the output image is linearly mapped to fit the display component 140 (block 388). It should be appreciated that the block order in which the process 380 is executed may be executed in a different order without departing from the scope of the present disclosure.

In various embodiments, during processing of an image when the hazy conditions mode is selected, a non-linear, edge preserving, low pass filter, such as median or by anisotropic diffusion is applied to the image (i.e., either from the thermal imager or the intensity component of the visible color image). In one aspect, the output from the low pass filter operation may be histogram equalized and scaled to map the dynamic range to the display and to maximize contrast of the display.

FIG. 3F shows one embodiment of an infrared processing technique 390 as described in reference to block 272 of FIG. 2B. In one embodiment, the infrared processing technique 390 comprises a shoreline mode of operation for maritime applications.

Referring to FIG. 3F, the shoreline may be resolved (block 392). For example as discussed previously, shoreline identification (e.g., horizon and/or shoreline) may be determined by applying an image processing transform (e.g., a Hough transform) to the image (block 392), which may be used to position the infrared camera's field of view and/or to provide a line (e.g., any type of marker, such as a red line(s) or other indicia on the displayed image. Next, the image is histogram equalized (block 394) and scaled (block 396) to form an output image. Next, the dynamic range of the output image is linearly mapped to fit the display component 140 (block 398). It should be appreciated that the block order in which the process 390 is executed may be executed in a different order without departing from the scope of the present disclosure.

In one embodiment, the information produced by the transform (e.g., Hough transform) may be used to identify the shoreline or even the horizon as a linear region for display. The transform may be applied to the image in a path separate from the main video path (e.g., the transform when applied does not alter the image data and does not affect the later image processing operations), and the application of the transform may be used to detect linear regions, such as straight lines (e.g., of the shoreline and/or horizon). In one aspect, by assuming the shoreline and/or horizon comprises a straight line stretching the entire width of the frame, the shoreline and/or horizon may be identified as a peak in the transform and may be used to maintain the field of view in a position with reference to the shoreline and/or horizon. As such, the input image (e.g., preprocessed image) may be histogram equalized (block 394) and sealed (block 396) to generate an output image, and then the transform information (block 392) may be added to the output image to highlight the shoreline and/or horizon of the displayed image.

Moreover, in the shoreline mode of operation, the image may be dominated by sea (i.e., lower part of image) and sky (i.e., upper part of image), which may appear as two peaks in the image histogram. In one aspect, significant contrast is desired over the narrow band of shoreline, and a low number (e.g., relatively based on the number of sensor pixels and the number of bins used in the histogram) may be selected for the plateau limit for the histogram equalization. In one aspect, for example, a low plateau limit (relative) may reduce the effect of peaks in the histogram and give less contrast to sea and sky while preserving contrast for the shoreline and/or horizon regions.

Figure 4:
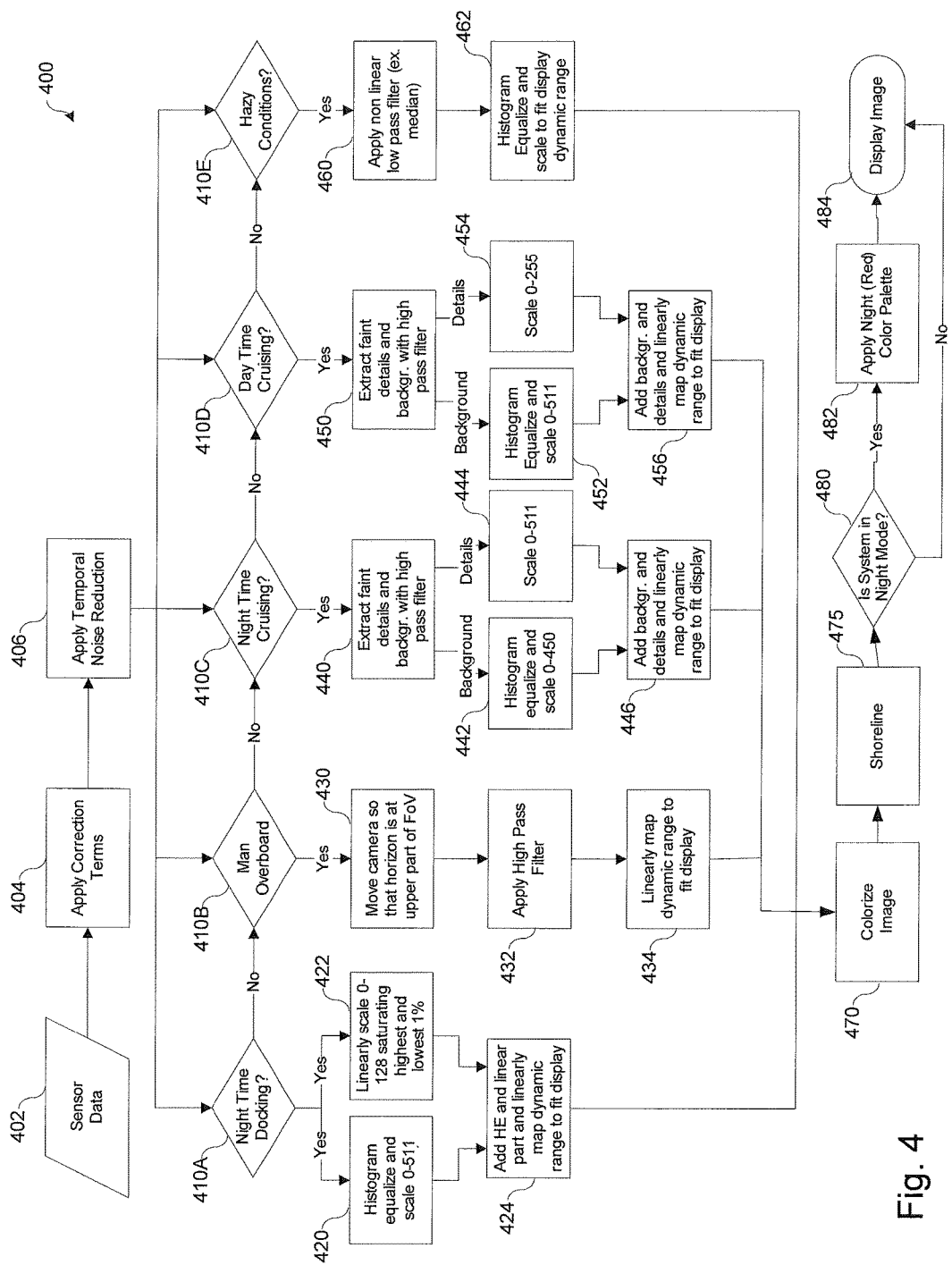
FIG. 4 shows a block diagram illustrating an overview of infrared processing techniques in accordance with one or more embodiments.

FIG. 4 shows a block diagram illustrating a method 400 of implementing maritime modes 410A-410E and infrared processing techniques related thereto, as described in reference to one or more embodiments. In particular, a first mode refers to night docking mode 410A, a second mode refers to man overboard mode 410B, a third mode refers to night cruising mode 410C, a fourth mode refers to day cruising mode 410D, and a fifth mode refers to hazy conditions mode 410E.

In one embodiment, referring to FIG. 4, processing component 110 of image capturing system 100 of FIG. 1 may perform method 400 as follows. Sensor data (i.e., infrared image data) of a captured image is received or obtained (block 402). Correction terms are applied to the received sensor data (block 404), and temporal noise reduction is applied to the received sensor data (block 406).

Next, at least one of the selected modes 410A-410E may be selected by a user or operator via control component 150 of image capturing system 100, and processing component 110 executes the corresponding processing technique associated with the selected maritime mode of operation. In one example, if night docking mode 410A is selected, then the sensor data may be histogram equalized and scaled (e.g., 0-511) (block 420), the sensor data may be linearly scaled (e.g., 0-128) saturating the highest and lowest (e.g., 1%) (block 422), and the histogram equalized sensor data is added to the linearly scaled sensor data for linearly mapping the dynamic range to display component 140 (block 424). In another example, if man overboard mode 410B is selected, then infrared capturing component 130 of image capturing system 100 may be moved or positioned so that the horizon is at an upper part of the field of view (FoV), a high pass filter (HPF) is applied to the sensor data (block 432), and the dynamic range of the high pass filtered sensor data is then linearly mapped to fit display component 140 (block 434).

In another example, if night cruising mode 410C is selected, the sensor data is processed to extract a faint detailed part and a background part with a high pass filter (block 440), the background part is histogram equalized and scaled (e.g., 0-450) (block 442), the detailed part is scaled (e.g., 0-511) (block 444), and the background part is added to the detailed part for linearly mapping the dynamic range to display component 140 (block 446). In another example, if day cruising mode 410D is selected, the sensor data is processed to extract a faint detailed part and a background part with a high pass filter (block 450), the background part is histogram equalized and scaled (e.g., 0-511) (block 452), the detailed part is scaled 0-255 (block 454), and the background part is added to the detailed part for linearly mapping the dynamic range to display component 140 (block 456). In still another example, if hazy condition mode 410E is selected, then a non-linear low pass filter (e.g., median) is applied to the sensor data (block 460), which is then histogram equalized and scaled for linearly mapping the dynamic range to display component 140 (block 462).

For any of the maritime modes (e.g., blocks 410A-410E), the image data for display may be marked (e.g., color coded, highlighted, or otherwise identified with indicia) to identify, for example, a suspected person in the water (e.g., for man overboard) or a hazard in the water (e.g., for night time cruising, day time cruising, or any of the other modes). For example, as discussed herein, image processing algorithms may be applied (block 470) to the image data to identify various features (e.g., objects, such as a warm-bodied person, water hazard, horizon, or shoreline) in the image data and appropriately mark these features to assist in recognition and identification by a user viewing the display. As a specific example, a suspected person in the water may be colored blue, while a water hazard (e.g., floating debris) may be colored yellow in the displayed image.

Furthermore for any of the maritime modes (e.g., blocks 410A-410E), the image data for display may be marked to identify, for example, the shoreline (e.g., shoreline and/or horizon). For example, as discussed herein, image processing algorithms may be applied (block 475) to the image data to identify the shoreline and/or horizon and appropriately mark these features to assist in recognition and identification by a user viewing the display. As a specific example, the horizon and/or shoreline may be outlined or identified with red lines on the displayed image to aid the user viewing the displayed image.

Next, after applying at least one of the infrared processing techniques for maritime modes 410A-410E, a determination is made as to whether to display the processed sensor data in night mode (i.e., apply the night color palette) (block 480), in a manner as previously described. If yes, then the night color palette is applied to the processed sensor data (block 482), and the processed sensor data is displayed in night mode (block 484). If no, then the processed sensor data is displayed in a non-night mode manner (e.g., black hot or white hot palette) (block 484). It should be appreciated that, in night mode, sensor data (i.e., image data) may be displayed in a red or green color palette to improve night vision capacity for a user or operator.

FIG. 5 shows a block diagram illustrating one embodiment of control component 150 of infrared imaging system 100 for selecting between different maritime modes of operation, as previously described in reference to FIGS. 1-4. In one embodiment, control component 150 of infrared imaging system 100 may comprise a user input and/or interface device, such as control panel unit 500 (e.g., a wired or wireless handheld control unit) having one or more push buttons 510, 520, 530, 540, 550, 560, 570 adapted to interface with a user and receive user input control values and further adapted to generate and transmit one or more input control signals to processing component 100. In various other embodiments, control panel unit 500 may comprise a slide bar, rotatable knob to select the desired mode, keyboard, touch screen display, etc., without departing from the scope of the present disclosure.

In various embodiments, a plurality of push buttons 510, 520, 530, 540, 550, 560, 570 of control panel unit 500 may be utilized to select between various maritime modes of operation as previously described in reference to FIGS. 1-4. In various embodiments, processing component 110 may be adapted to sense control input signals from control panel unit 500 and respond to any sensed control input signals received from push buttons 510, 520, 530, 540, 550, 560, 570. Processing component 110 may be further adapted to interpret the control input signals as values. In various other embodiments, it should be appreciated that control panel unit 500 may be adapted to include one or more other push buttons (not shown) to provide various other control functions of infrared imaging system 100, such as auto-focus, menu enable and selection, field of view (FoV), brightness, contrast, and/or various other features. In another embodiment, control panel unit 500 may comprise a single push button, which may be used to select each of the maritime modes of operation 510, 520, 530, 540, 550, 560, 570.

In another embodiment, control panel unit 500 may be adapted to be integrated as part of display component 140 to function as both a user input device and a display device, such as, for example, a user activated touch screen device adapted to receive input signals from a user touching different parts of the display screen. As such, the GUI interface device may have one or more images of, for example, push buttons 510, 520, 530, 540, 0.550, 560, 570 adapted to interface with a user and receive user input control values via the touch screen of display component 140. As another example, control panel unit 500 may have one or more user input touch screen push buttons to selected a desired mode of operation (e.g., application or configuration (e.g., as discussed in reference to FIG. 2A).

In one embodiment, referring to FIG. 5, a first push button 510 may be enabled to select the night docking mode of operation, a second push button 520 may be enabled to select the man overboard mode of operation, a third push button 530 may be enabled to select the night cruising mode of operation, a fourth push button 540 may be enabled to select the day cruising mode of operation, a fifth push button 550 may be enabled to select the hazy conditions mode of operation, a sixth push button 560 may be enabled to select the shoreline mode of operation, and a seventh push button 570 may be enabled to select or turn the night display mode (i.e., night color palette) off. In another embodiment, a single push button for control panel unit 500 may be used to toggle each of the maritime modes of operation 510, 520, 530, 540, 550, 560, 570 without departing from the scope of the present disclosure.

Figure 6A:
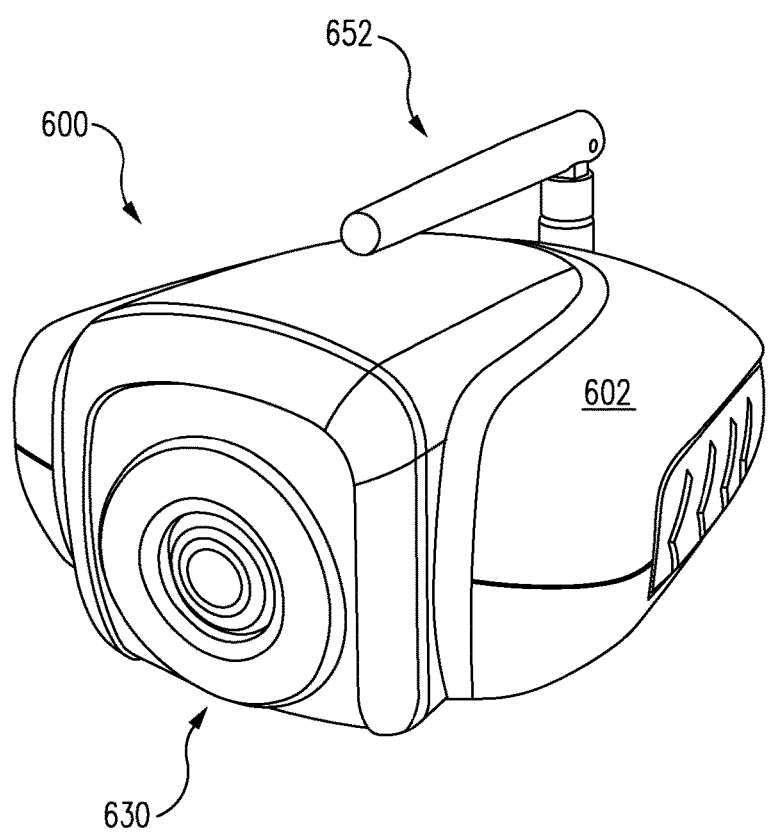
FIGS. 6A-6B show various views of an infrared camera adapted for capturing and processing infrared images, in accordance with an embodiment.
Figure 6B:
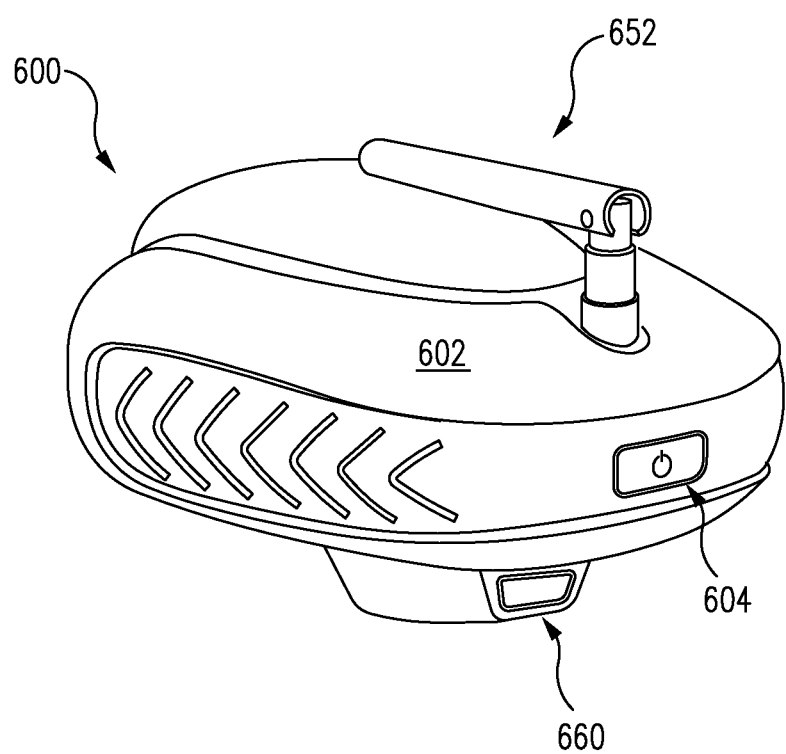

FIGS. 6A-6B show various views of an infrared camera 600 adapted for capturing and processing infrared images, in accordance with one or more embodiments. In one embodiment, infrared camera 600 includes a housing 602 and one or more of the functional components of infrared imaging system 100 of FIG. 1. For example, housing 602 may include a hard shell structure with a hollow interior portion adapted to encapsulate the internal components including the processing components of infrared camera 600.

In one example, infrared camera 600 includes an image capture component 630 having the functional capabilities of image capture component 130 (e.g., representing a lens, an infrared detector, and associated components) of infrared imaging system 100 and a communication component 652 (e.g., representing an antenna and associated transceiver components) having the functional capabilities of image capture component 152 of infrared imaging system 100.

In another example, as shown in FIG. 6B, infrared camera 600 includes a mode sensing component 660 having, for example, the functional capabilities of mode sensing component 160 of infrared imaging system 100. For example, mode sensing component 660 may sense the type of mount infrared camera 600 is coupled to such that infrared camera 600 may reconfigure and apply the appropriate processing techniques (e.g., as discussed herein in reference to FIG. 2A). In one or more embodiments, the mode sensing component 660 is contoured to be selectively adaptable for mounting or coupling to different adapters or docking stations for varied use in reference to different embodiments, as described herein. In general as discussed herein for one or more embodiments, mode sensing component 660 may be implemented to engage or sense a mechanical triggering mechanism, an electronic triggering mechanism, and electro-mechanical triggering mechanism, or some combination thereof for determining the appropriate mode of operation.

As a further example, infrared camera 600 may include one or more input devices 604, which may represent one or more user-input devices and/or one or more electrical connectors (e.g., representing at least a portion of mode sensing component 160). As a specific example, input device 604 may represent a power button for a user to switch on/off infrared camera 600 and/or may represent other user-input controls corresponding to control component 150. As another specific example, input device 604 may represent one or more electrical connectors through which various electrical signals may be transmitted and/or received, such as for example to provide image signals to an associated display, to receive power, and/or to receive an electrical signal for mode sensing component 160 to indicate the type of application such that the appropriate mode of operation may be applied.

Figure 7A:
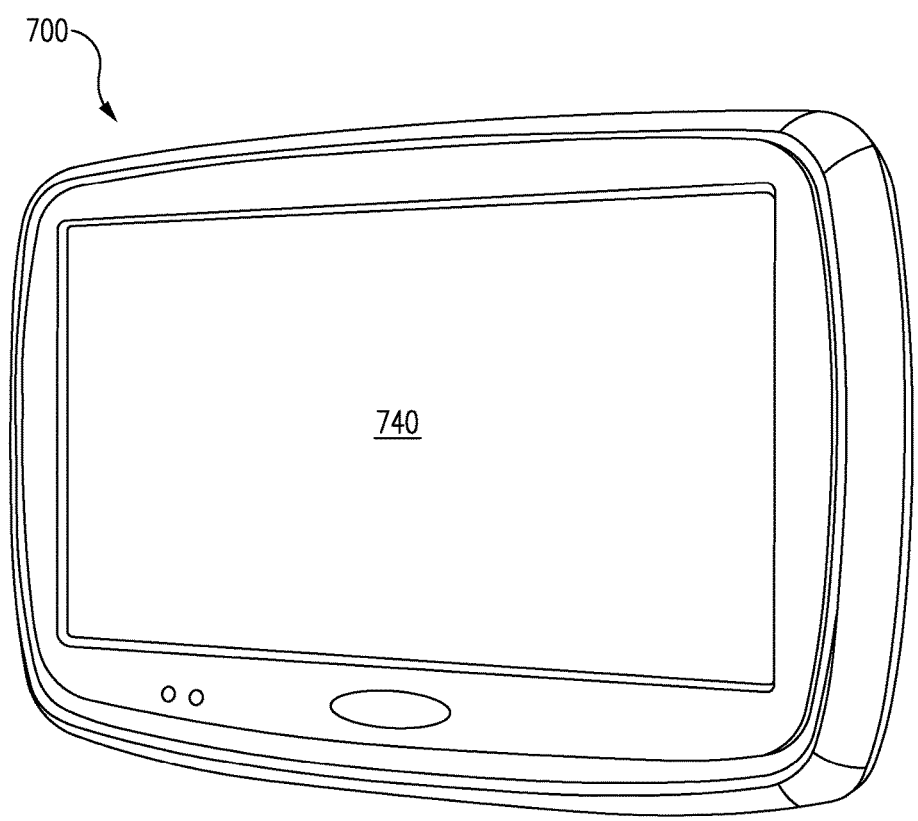
FIGS. 7A-7C show various views of a monitor for displaying infrared images, in accordance with an embodiment.
Figure 7B:
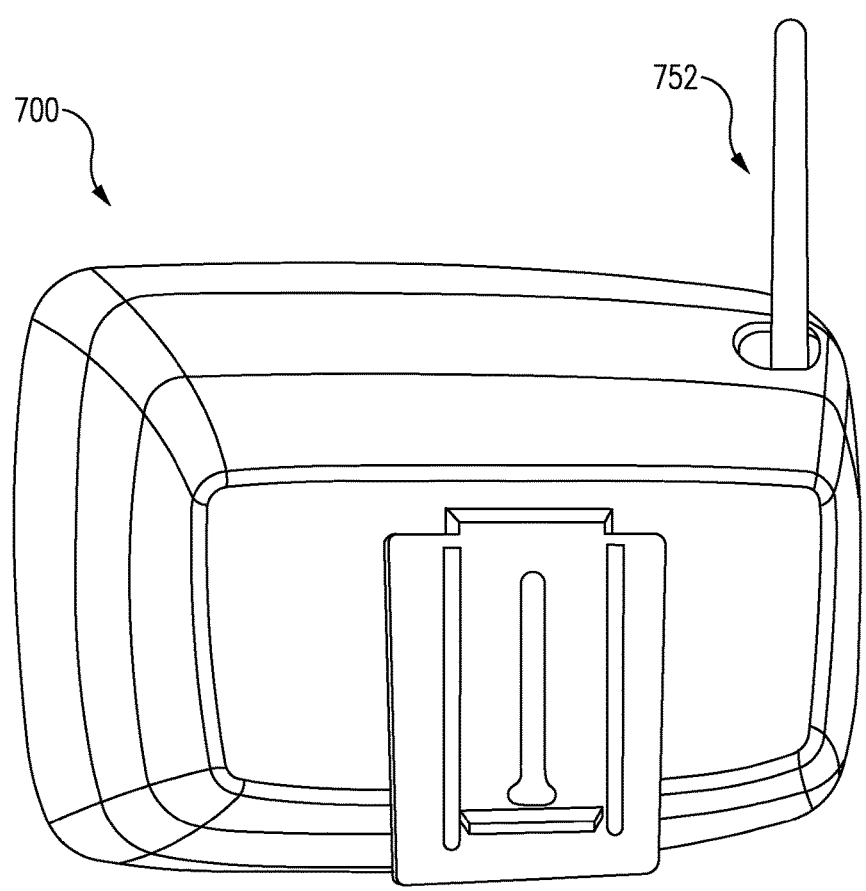
Figure 7C:
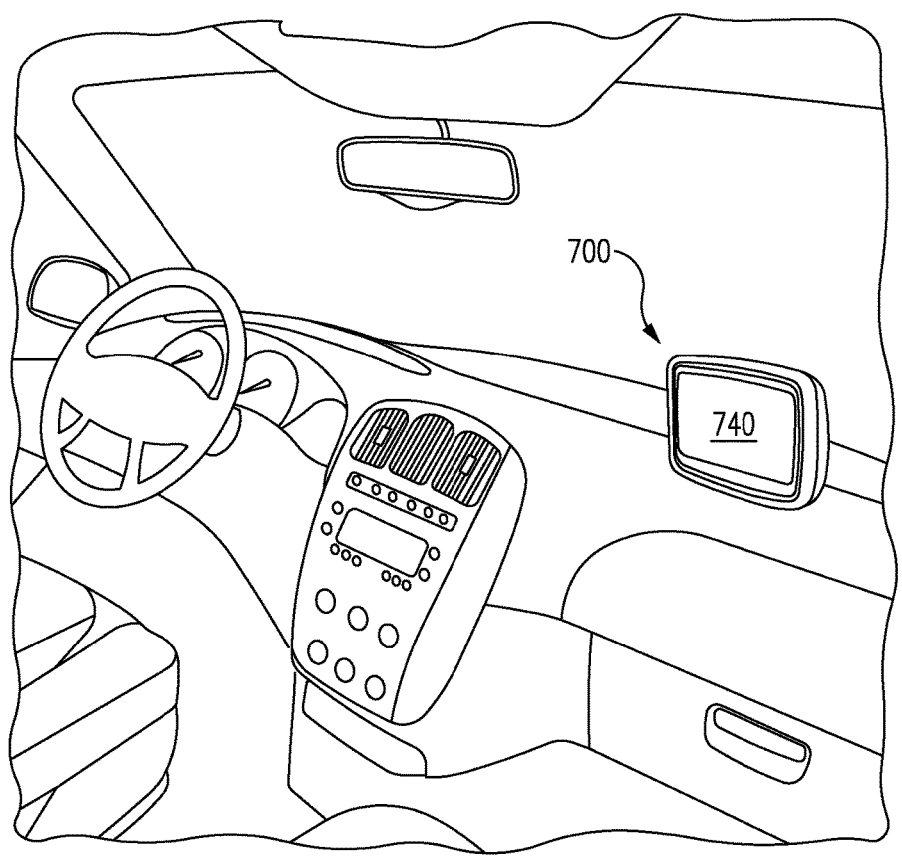

FIGS. 7A-7C show various views of a monitor 700 for displaying infrared images, in accordance with one or more embodiments. In one embodiment, infrared camera 600 may utilize an infrared monitor 700 to display captured and/or processed images. In one example, infrared monitor 700 includes a liquid crystal display (LCD) screen 740 having the functional capabilities of display component 140 of infrared imaging system 100 and may further function as a touch screen as discussed herein.

In another embodiment, referring to FIG. 7B, infrared monitor 700 may include a communication component 752 for remote display of captured and/or processed images from infrared camera 700. In one aspect, communication component 752 represents an antenna (e.g., including transceiver and associated components) and has the functional capabilities of communication component 152 of infrared imaging system 100. In another aspect, communication component 752 of infrared monitor 700 is adapted to communicate with communication component 652 of infrared camera 600 via wireless network (e.g., using one or more known wireless communication standards). For example for an embodiment, monitor 700 may represent a smart phone, a tablet, or other type of wired or wireless display device that may receive infrared image data and may further transmit user control signals or other information to infrared camera 600.

Referring to FIG. 7C, infrared camera 600 may remotely display captured and/or processed images on infrared monitor 700 as a vehicle accessory in a vehicle, such as an automobile, in a wired or wireless configuration with infrared camera 600. As shown in FIG. 7C, infrared monitor 700 may be hard mounted on, clipped to, or otherwise attached to a dash (or other portion) of a vehicle within view of a user, such as a driver and/or passenger of the vehicle. In another embodiment, the infrared camera 600 may include a direct wireless connection to a mobile communication device, such as a mobile cell phone, a smart phone, a tablet, a personal digital assistant, or a laptop computer to use the display of the mobile communication device to display the infrared images.

FIGS. 8A-8D show various views of a first adapter 800 for coupling infrared camera 600 of FIGS. 6A-6B to a first vehicle, such as a land based vehicle, or portion thereof, in accordance with one or more embodiments. In one aspect, first adapter 800 may be referred to as a first docking station (e.g., accessory or mount) adapted for use with a first vehicle embodiment, as described herein.

Figure 8A:
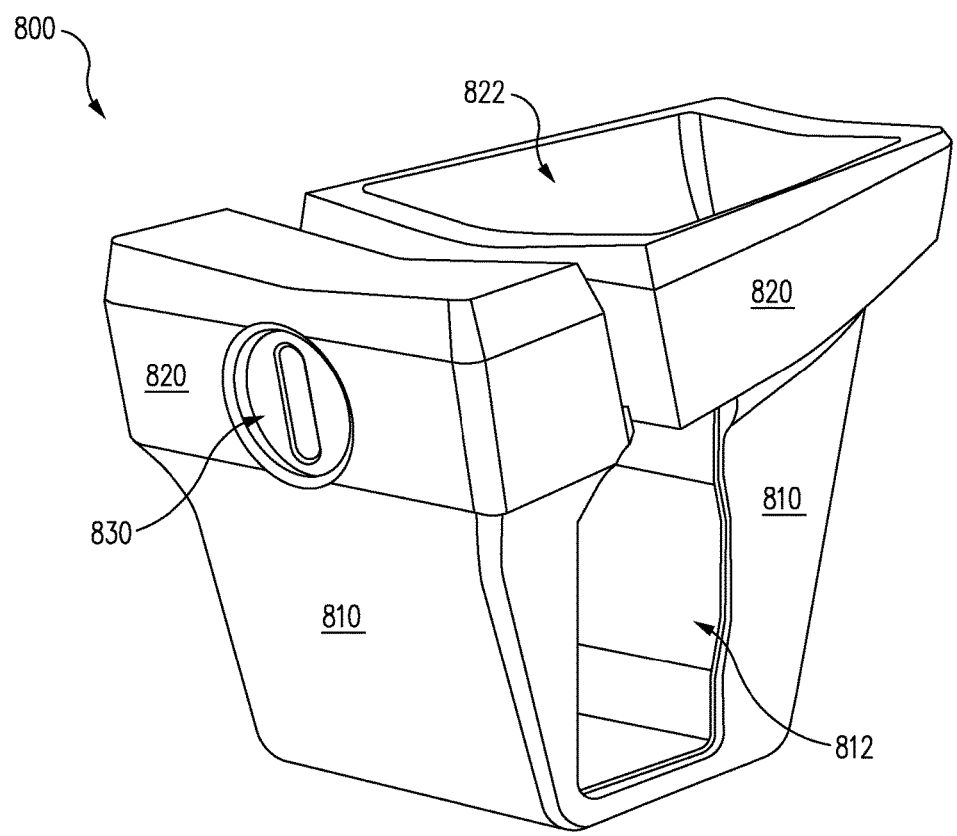
FIGS. 8A-8D show various views of a first adapter for coupling the infrared camera to a first vehicle, in accordance with an embodiment.
Figure 8B:
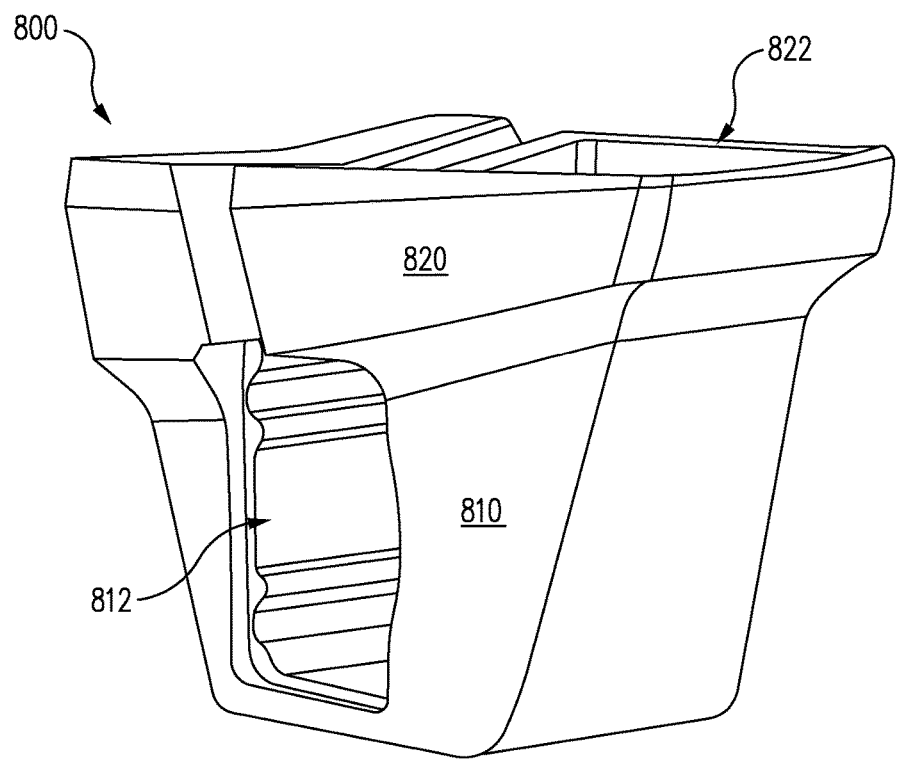

In one embodiment, referring to FIGS. 8A-8B, first adapter 800 includes a base portion 810, a platform portion 820, and a locking mechanism 830. Base portion 810 and platform portion 820 may be integrated into a single rigid structure capable of supporting infrared camera 600 while being secured to a vehicle. Base portion 810 includes a mounting aperture 812 for securing first adapter 800 to a vehicle or portion thereof, such as a roof rack or handlebars of a cycle.

Figure 8C:
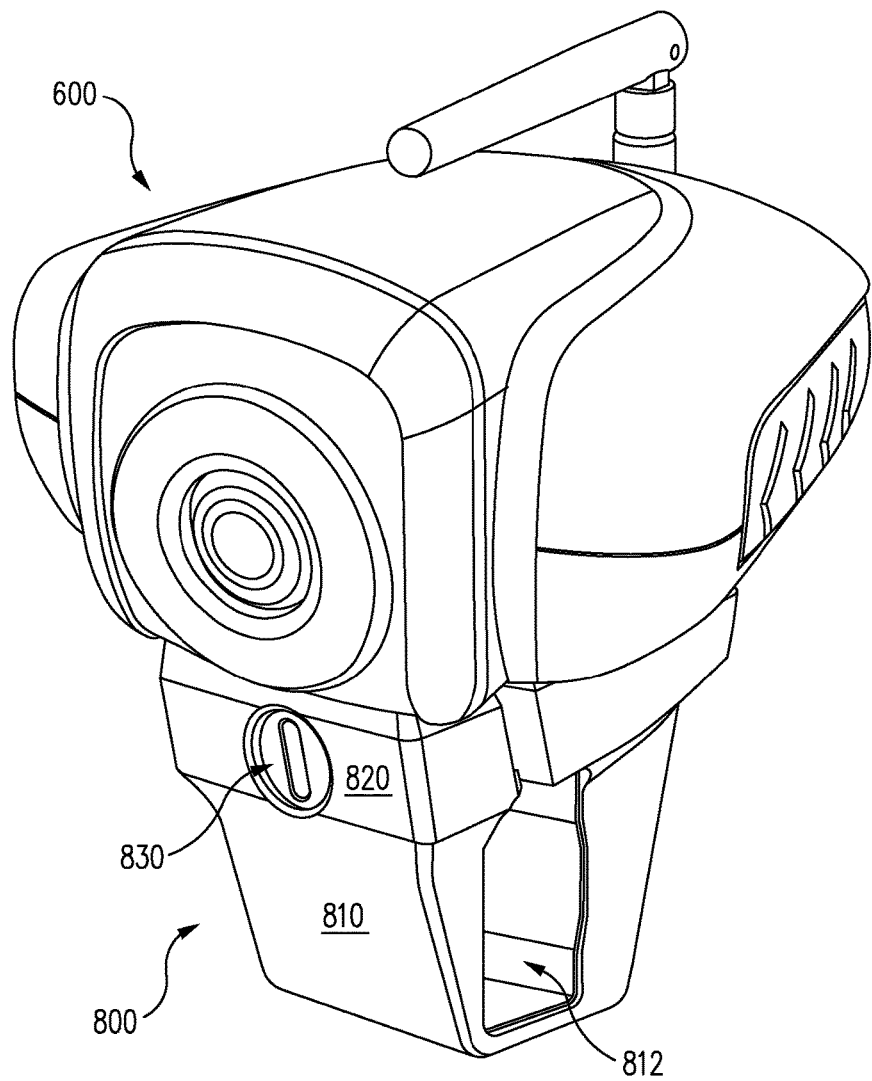
Figure 8D:
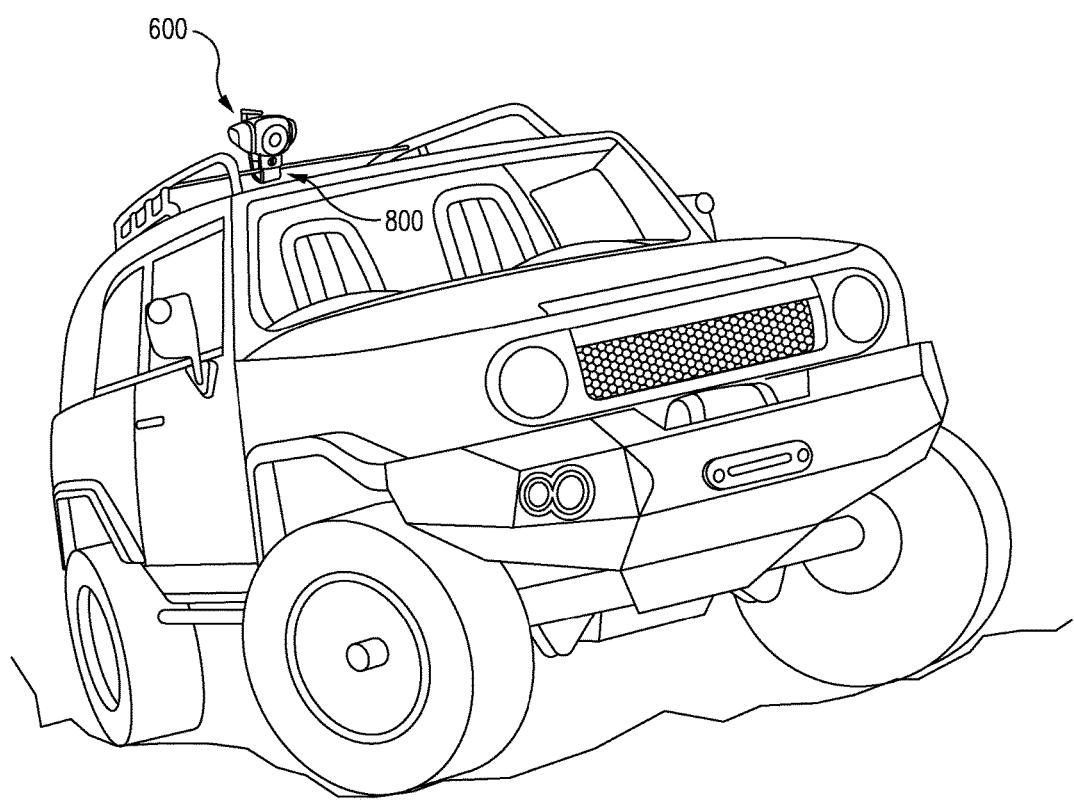

Referring to FIG. 8C, platform 820 of first adapter 800 is contoured to receive infrared camera 600 for secure attachment to first adapter 800. Platform 820 includes a mounting recess 822 adapted to receive mode sensing component 660 of infrared camera 600. In one aspect, infrared camera 600 is mounted to platform 820 of first adapter 800 by coupling mode sensing component 660 to mounting recess 822 of first adapter 800, which provides a mode sensing signal to processing component 110 of infrared camera 600 for determining the mode of operation, such as being mounted to a land based vehicle or portion thereof.

Locking mechanism 830 includes, in one embodiment, a fastening screw adapted to provide a clamping effect to an object positioned in mounting aperture 812 so as to securely fasten first adapter 800 to the object. For example, referring to FIG. 8D, infrared camera 600 may be mounted to first adapter 800, and the mounted combination may be mounted to a vehicle or portion thereof, such as a roof rack of the vehicle. Alternatively or in addition, locking mechanism 830 may function to secure infrared camera 600 to first adapter 800, such as by locking mechanism 830 engaging with a portion of mode sensing component 660.

In one embodiment, first adapter 800 may include a mode locking mechanism adapted to provide a coupling effect to mode sensing component 660 when infrared camera 600 is positioned in mounting recess 822 of base portion 810. The mode locking mechanism may include a triggering mechanism that provides a mode sensing signal to processing component 110 of infrared camera 600 for determining the mode of operation when mode sensing component 660 is coupled with mounting recess 822 of first adapter 800.

FIGS. 9A-9D show various views of a second adapter 900 for coupling infrared camera 600 of FIGS. 6A-6B to a second vehicle, such as a watercraft, or portion thereof, in accordance with one or more embodiments. In one aspect, the second adapter 900 may be referred to as a second docking station adapted for use with a second vehicle embodiment, as described herein. Second adapter 900 may include a pan/tilt mechanism or may be adapted to couple to a pan/tilt mechanism, in accordance with one or more embodiments.

Figure 9A:
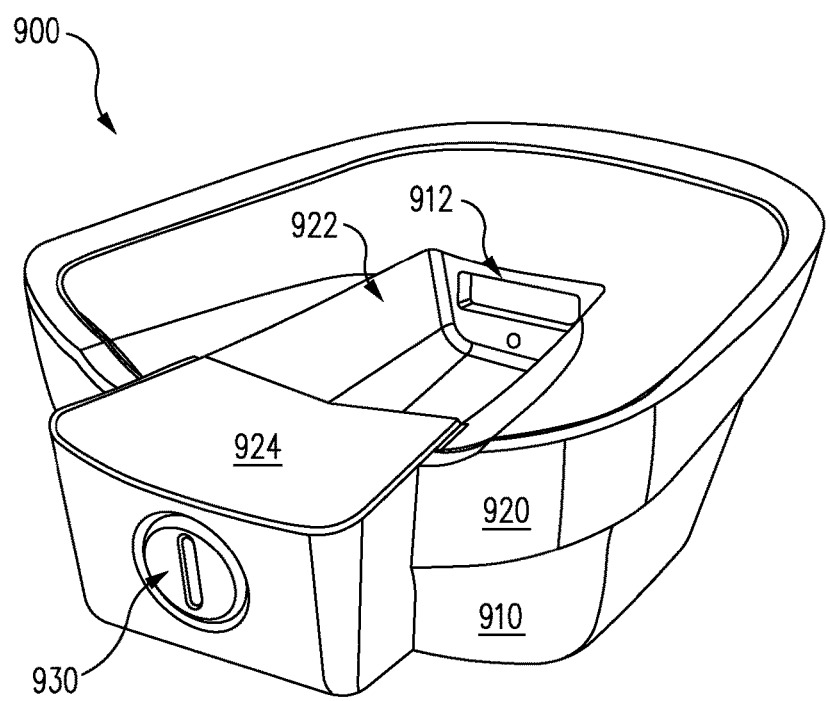
FIGS. 9A-9D show various views of a second adapter for coupling the infrared camera to a second vehicle, in accordance with an embodiment.
Figure 9B:
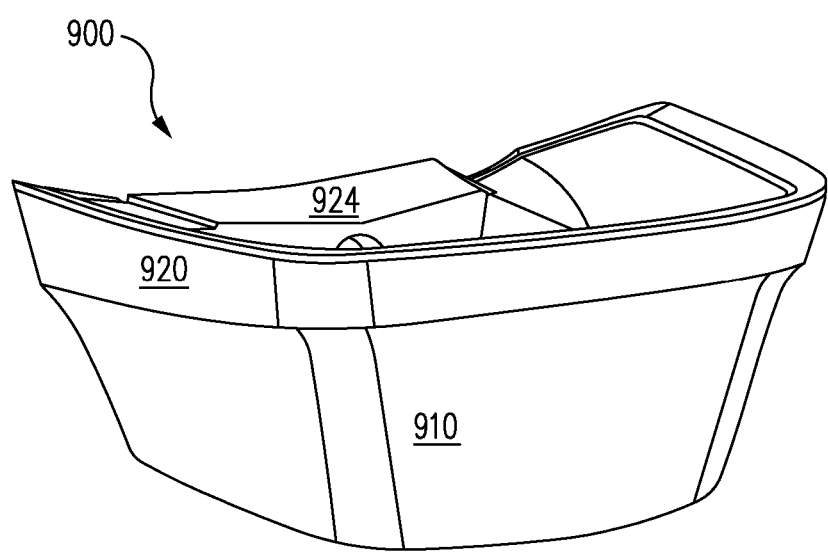

In one embodiment, referring to FIGS. 9A-9B, second adapter 900 includes a base portion 910, a platform portion 920, mounting portion 924, and a locking mechanism 930. Base portion 910 and platform portion 920 may be integrated into a single rigid structure capable of supporting infrared camera 600 while being secured to a vehicle. Base portion 910 includes a mounting aperture 912 for securing second adapter 900 to a vehicle or portion thereof, providing an electrical connection, and/or provide mode sensing component 660 with information as to the appropriate mode, in accordance with one or more embodiments.

Figure 9C:
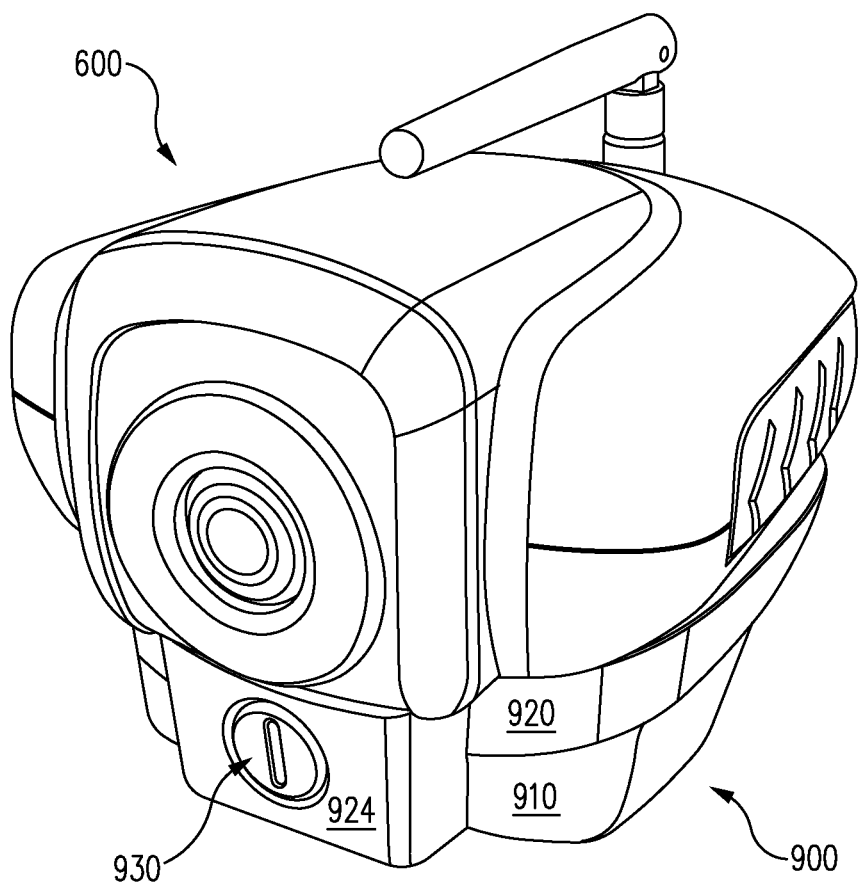
Figure 9D:
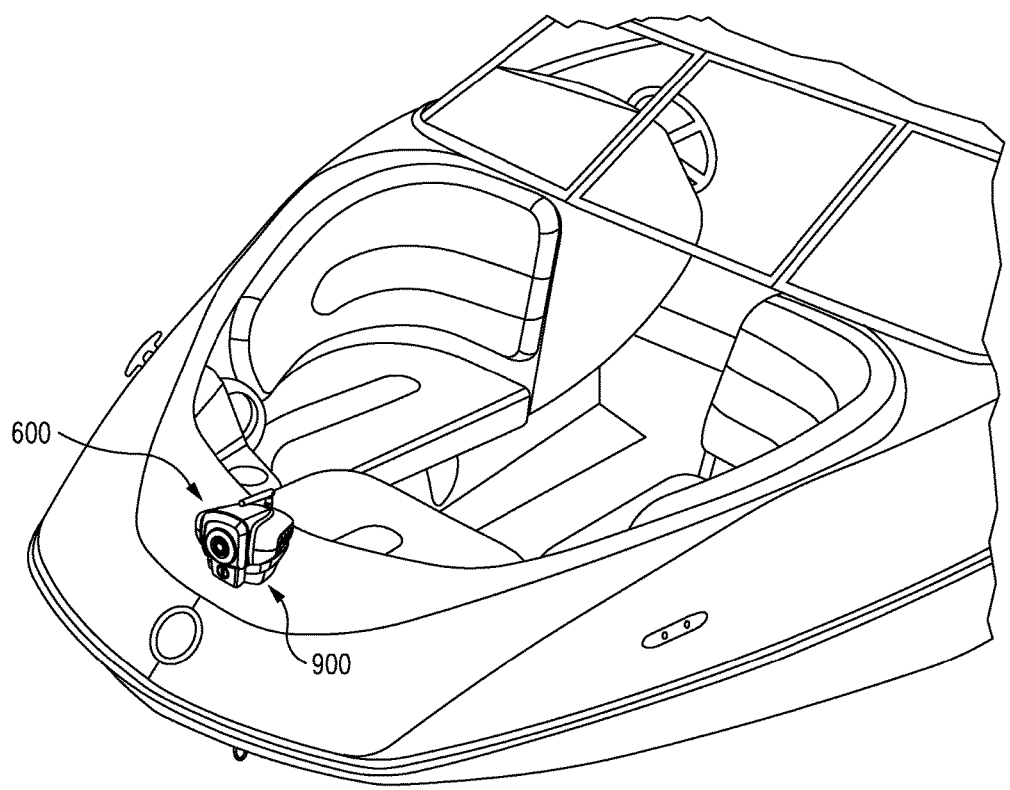

Referring to FIGS. 9B-9C, platform 920 of second adapter 900 is contoured to receive infrared camera 600 for secure attachment to second adapter 900. Platform 920 includes a mounting recess 922 adapted to receive mode sensing component 660 of infrared camera 600. In one aspect, infrared camera 600 is mounted to platform 920 of second adapter 900 by coupling mode sensing component 660 to mounting recess 922 and/or mounting aperture 912 of second adapter 900, which provides a mode sensing signal to processing component 110 of infrared camera 600 for determining the mode of operation, such as being mounted to a watercraft or portion thereof.

Locking mechanism 930 includes, in one embodiment, a fastening screw adapted to provide a fastening effect to an object positioned under mounting portion 924 so as to securely fasten second adapter 900 to the object. Mounting portion 924 is adapted to couple with mounting recess 922 of base portion 910 and provide a clamping effect to base portion 910 when secured to an object. For example, referring to FIG. 9D, infrared camera 600 may be mounted to second adapter 900, and the mounted combination may be mounted to a vehicle or portion thereof, such as the bow of a watercraft. Alternatively or in addition, locking mechanism 930 may function to secure infrared camera 600 to second adapter 900, such as by locking mechanism 930 engaging with a portion of mode sensing component 660.

In one embodiment, second adapter 900 may include a mode locking mechanism adapted to provide a coupling effect to mode sensing component 660 when infrared camera 600 is positioned in mounting recess 922 and/or mounting aperture 912 of base portion 910. The mode locking mechanism may include a triggering mechanism that provides a mode sensing signal to processing component 110 of infrared camera 600 for determining the mode of operation when mode sensing component 660 is coupled with mounting recess 922 and/or mounting aperture 912 of second adapter 900.

FIGS. 10A-10D show various views of a third adapter 1000 for coupling infrared camera 600 of FIGS. 6A-6B to a handheld device or tool, in accordance with one or more embodiments. In one aspect, the third adapter 1000 may be referred to as a third docking station adapted for use with a handheld embodiment, as described herein.

Figure 10A:
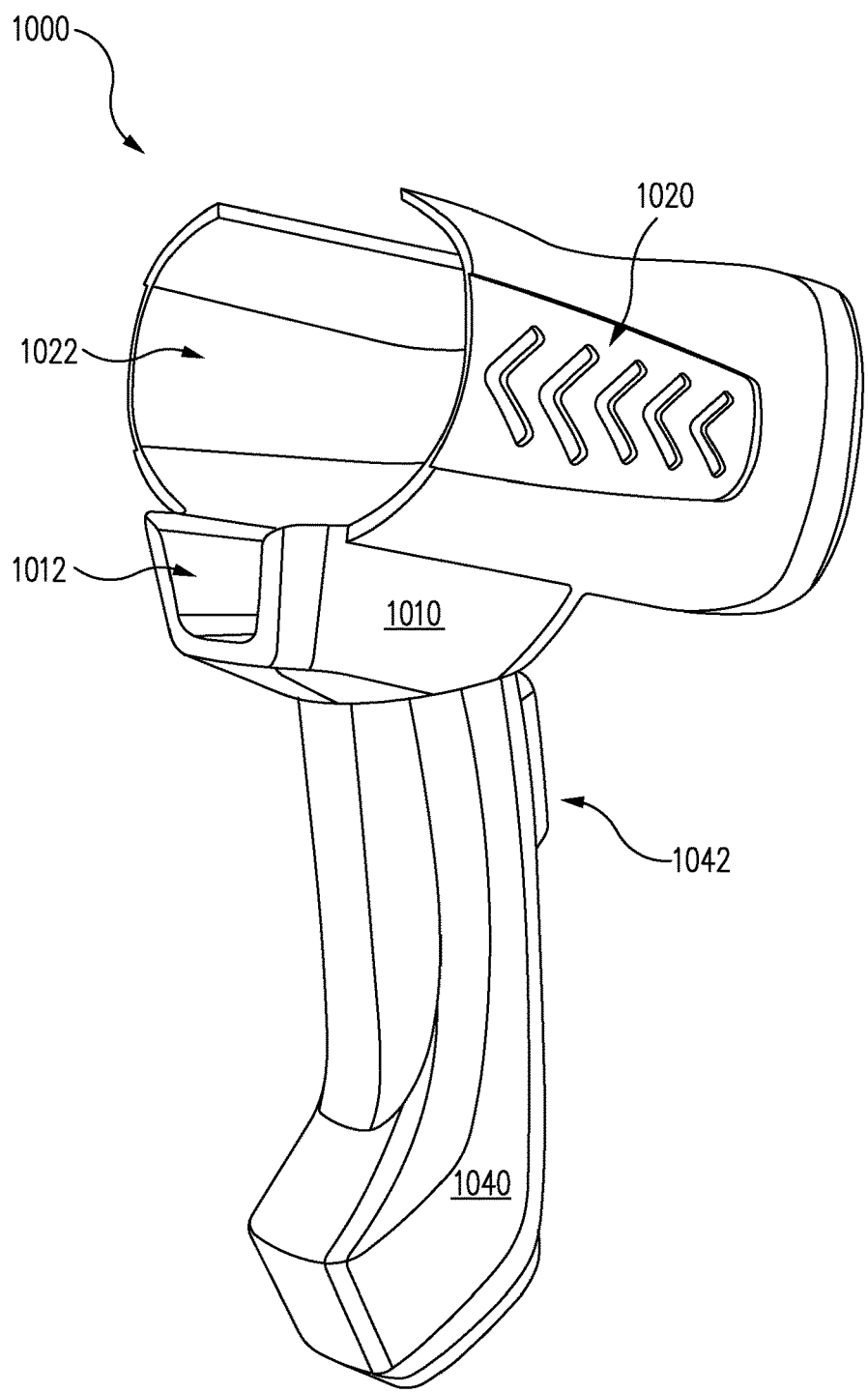
FIGS. 10A-10D show various views of a third adapter for coupling the infrared camera to a handheld device, in accordance with an embodiment.
Figure 10B:
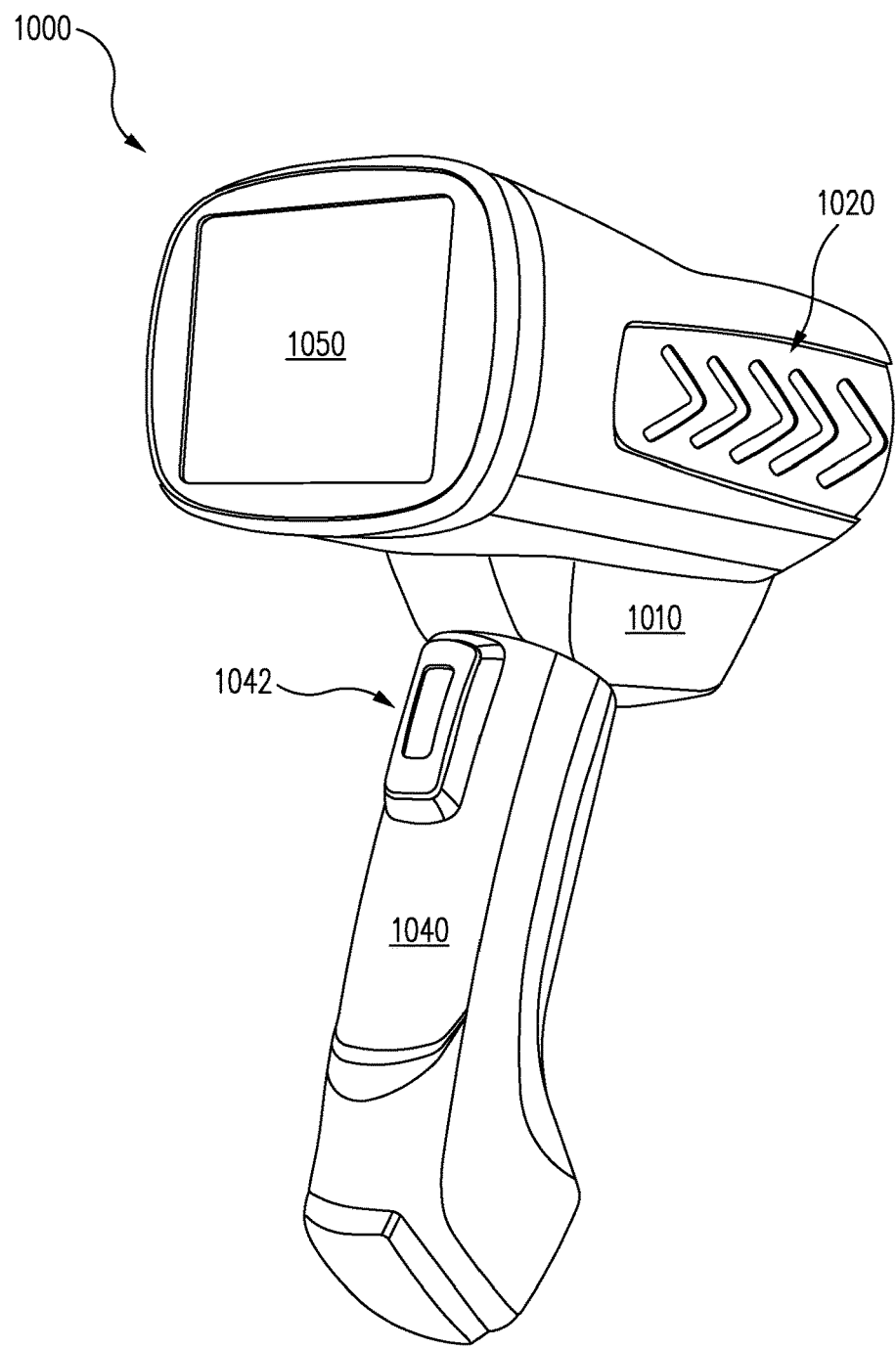

In one embodiment, referring to FIGS. 10A-10B, third adapter 1000 includes a base portion 1010, an enclosure 1020, and a handle 1040. Base portion 1010, enclosure 1020, and handle 1040 may be integrated into a single rigid structure capable of supporting and securing infrared camera 600 while in use.

Referring to FIG. 10A, base portion 1010 includes a mounting channel 1012 and enclosure 1020 includes a mounting cavity 1022 for securing infrared camera 600 to third adapter 1000. Referring to FIG. 10B, handle 1040 includes a user-activated trigger 1042 (e.g., for receiving various user input control signals) and enclosure 1020 may include a monitor 1050, such as, for example, an LCD monitor. In one aspect, trigger 1042 is adapted to power up infrared camera 600 and monitor 1050 upon user activation, such as by a user pressing trigger 1042, for viewing of infrared images with monitor 1050.

Figure 10C:
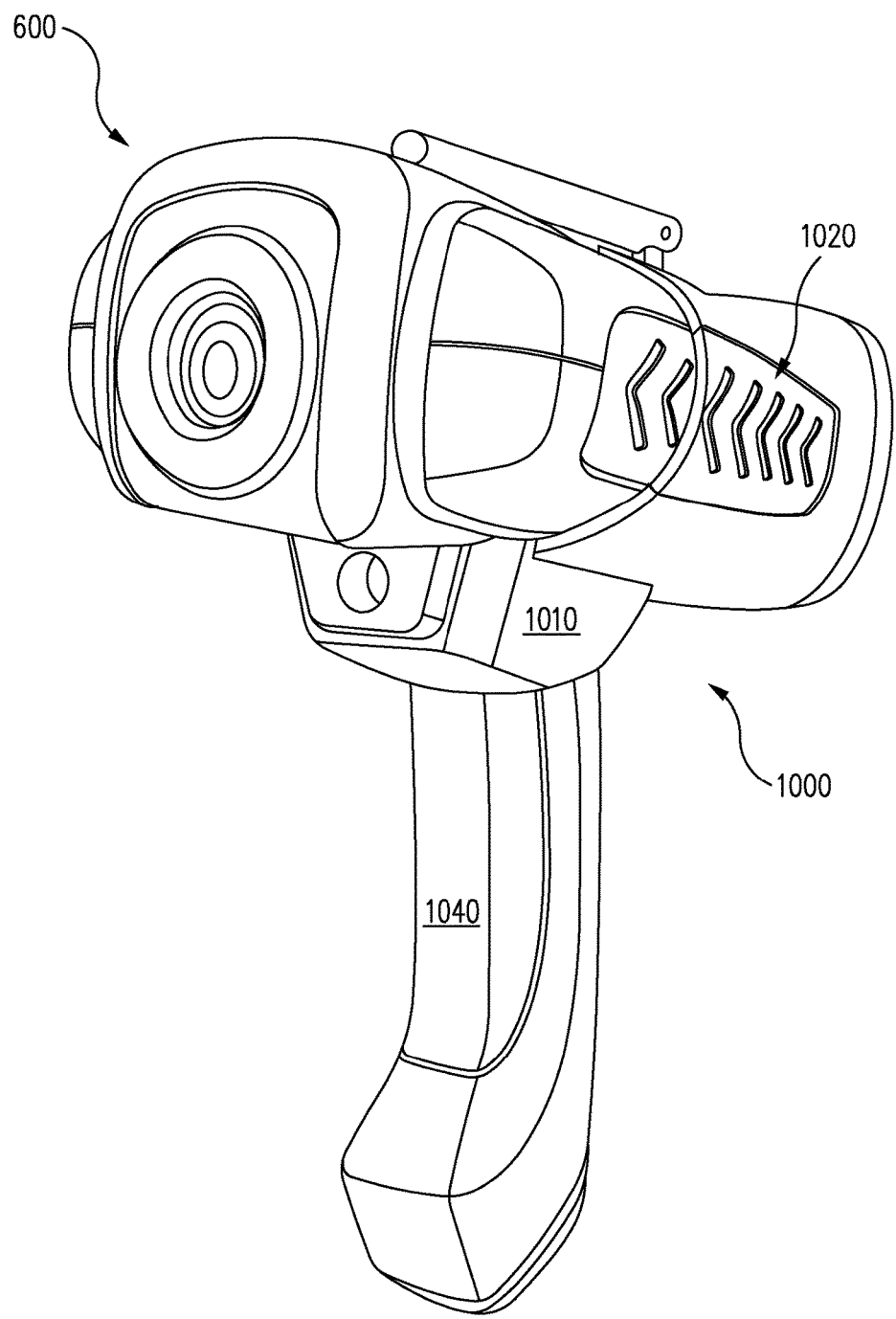
Figure 10D:
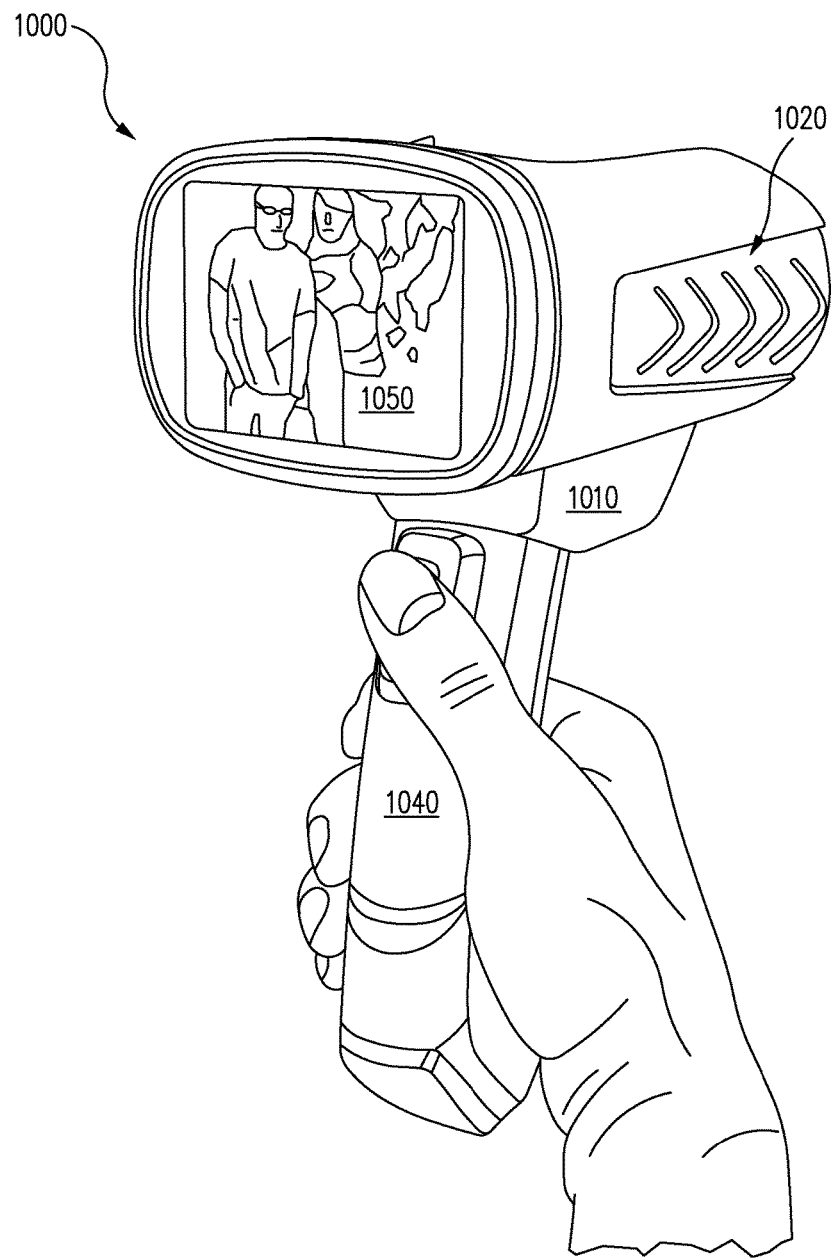

Referring to FIG. 10C, enclosure 1020 of third adapter 1000 is contoured to receive infrared camera 600 within mounting cavity 1022 for secure attachment to third adapter 1000. Base portion 1010 includes mounting channel 1012 adapted to receive mode sensing component 660 of infrared camera 600. In one aspect, infrared camera 600 is mounted to base portion 1010 and enclosure 1020 of third adapter 1000 by coupling (e.g., sliding) housing 602 within enclosure 1020 and by coupling (e.g., sliding) mode sensing component 660 within mounting channel 1012 of third adapter 1000, which provides a mode sensing signal to processing component 110 of infrared camera 600 for determining the mode of operation, such as being mounted to a land based vehicle or portion thereof.

In one embodiment, third adapter 1000 may include a mode locking mechanism adapted to provide a coupling effect to housing 602 and/or mode sensing component 660 when infrared camera 600 is positioned in enclosure 1022 and/or mounting channel 1012, respectively, so as to securely fasten infrared camera 600 to third adapter 1000. For example, referring to FIGS. 10C-10D, infrared camera 600 may be mounted to third adapter 1000 and the mounted combination may be held by a user via handle 1040. The mode locking mechanism may include a triggering mechanism that provides a mode sensing signal to processing component 110 of infrared camera 600 for determining mode of operation when mode sensing component 660 is coupled with enclosure 1022 and/or mounting channel 1012.

In one embodiment, a dual mounted infrared camera may provide stereo vision for real night navigation capability. Infrared vision by dual mounted cameras may be configured to provide peripheral vision to reduce the limitations of darkness prohibiting activities.

In another embodiment, the modular infrared camera system may include a direct wireless connection to a mobile communication device, such as a mobile cell phone or other type of wireless device, for display and therefore, third adapter 1000 may optionally not include monitor 1050. In another embodiment, the modular infrared camera system may be configured to be worn on a user's head with a head securing device, such as a helmet or head strap. Also, a display device, such as an LCD, may be incorporated into eye wear, such as goggles or eyeglasses, with a direct wireless connection to the head-mounted modular infrared camera system for display via the eye wear.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

In various embodiments, software for mode modules 112A-112N may be embedded (i.e., hard-coded) in processing component 110 or stored on memory component 120 for access and execution by processing component 110. In one aspect, code (e.g., software and/or embedded hardware) for mode modules 112A-112N may be adapted to define preset display functions that allow processing component 100 to automatically switch between various processing techniques for sensed modes of operation, as described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A modular camera system comprising:
a plurality of adapters respectively having different mounts each corresponding to a respective specific one of a plurality of modes of operation, wherein each mode of operation is associated with an intended application for the modular camera system; and
a camera having the plurality of modes of operation, wherein the camera is configured to operate in a default mode of operation when the camera is decoupled from any of the plurality of adapters and configured to automatically self-configure to operate in at least one specific mode of operation of the plurality of modes of operation when the camera is coupled to the mount of the respective adapter corresponding to the at least one specific mode of operation, the camera comprising:
a housing configured to encapsulate one or more internal components of the camera;
an image capture component configured to capture an image;
a processing component, within the housing, configured to process the captured image according to at least one of the plurality of modes of operation; and
a mode sensing component configured to sense the mount corresponding to the specific mode of operation for the intended application of the camera based on structural features of the mount of the corresponding adapter when coupled to the camera, and configured to provide, by the mode sensing component to the processing component, a mode sensing signal indicative of the specific mode of operation corresponding to the sensed mount to automatically self-configure the mode of operation of the camera to the specific mode of operation for processing the captured image; and
wherein each of the plurality of adapters is configured to releasably couple to the housing of the camera and trigger the mode sensing component of the camera to provide the mode sensing signal to the processing component based on the associated mount of the adapter if coupled to the housing of the camera.

2. The system of claim 1, wherein:
the plurality of adapters comprise an adapter for a land-based vehicle application;
the adapter for the land-based vehicle application is configured to:
mount to a land-based vehicle; and
trigger the mode sensing component to provide the mode sensing signal for the land-based vehicle application, in response to which the processing component processes the captured image according to a land-based vehicle mode of operation that provides at least a basic monochrome display with selected automatic gain control parameters and pedestrian and/or animal detection enabled;
the structural features comprise mechanical connections and/or electrical connections; and the mode sensing component is configured to sense the mount at least by sensing the mechanical connections and/or electrical connections associated with the mount.

3. The system of claim 1, wherein:
the plurality of adapters comprise an adapter for a maritime application;
the adapter for the maritime application is configured to:
  mount to a watercraft; and
  trigger the mode sensing component to provide the mode sensing signal for the maritime application, in response to which the processing component processes the captured image according to a maritime mode of operation that provides at least a red hue display and with maritime automatic gain control selections;
the different mounts are differently contoured mounts; and
the mode sensing component is configured to sense the mount at least by sensing a contour associated with the mount.

4. The system of claim 1, wherein:
the plurality of adapters comprise an adapter for a handheld application;
the adapter for the handheld application comprises a handle configured to be held by a user; and
the adapter for the handheld application is configured to trigger the mode sensing component to provide the mode sensing signal for the handheld application, in response to which the processing component processes the captured image according to a handheld mode of operation that provides at least an absolute temperature readout and/or a low power mode of operation.

5. The system of claim 1, further comprising:
a memory component configured to store the processed image;
a display component configured to display the processed image; and
an environmental sensing component configured to provide environmental information to the processing component.

6. The system of claim 1, further comprising:
a control component configured to provide a plurality of selectable processing modes to a user, receive a user input corresponding to a user-selected processing mode, and generate a control signal indicative of the user-selected processing mode,
wherein the processing component is configured to receive the control signal from the control component and process the captured image according to the user-selected processing mode.

7. The system of claim 6, wherein the plurality of selectable processing modes include a night docking mode that causes the processing component to histogram equalize and scale the captured image to process the captured image.

8. The system of claim 6, wherein the plurality of selectable processing modes include a man overboard mode that causes the processing component to apply a high pass filter to the captured image to process the captured image.

9. The system of claim 6, wherein the plurality of selectable processing modes include:
a night cruising mode that causes the processing component to extract a detailed part and a background part from the captured image, separately scale the detailed part, separately histogram equalize and scale the background part, and add the detailed part to the background part to process the captured image; and
a day cruising mode that causes the processing component to extract the detailed part and the background part from the captured image, separately scale the detailed part, separately histogram equalize and scale the background part, and add the detailed part to the background part to process the captured image.

10. The system of claim 6, wherein the plurality of selectable processing modes include a hazy conditions mode that causes the processing component to apply a non-linear low pass filter on the captured image, and then histogram equalize and scale the filtered image to process the captured image.

11. The system of claim 6, wherein the plurality of selectable processing modes include a shoreline mode that causes the processing component to apply a Huff or Hough transform operation to the captured image to process the captured image.

12. A method of processing an image, the method comprising:
capturing an image by a camera having a plurality of modes of operation;
sensing a mount corresponding to a specific mode of operation that corresponds to an intended application of the camera based on structural features of the mount of an adapter that is releasably coupled to the camera, the specific mode of operation being one of the plurality of modes of operation, the adapter being selected from a plurality of couplable adapters respectively having different mounts each corresponding to a respective specific one of the plurality of modes of operation, wherein each mode of operation is associated with a respective intended application, wherein the camera is configured to operate in a default mode of operation when the camera is decoupled from any of the plurality of couplable adapters and configured to automatically self-configure to operate in at least one specific mode of operation of the plurality of modes of operation when the camera is coupled to the mount of the respective couplable adapter corresponding to the at least one specific mode of operation;
providing, by a mode sensing component of the camera to a processing component of the camera, a mode sensing signal indicative of the specific mode of operation corresponding to the sensed mount to automatically self-configure the mode of operation of the camera to the specific mode of operation for processing the captured image based on the intended application; and
processing the captured image according to the mode sensing signal.

13. The method of claim 12, wherein:
the plurality of couplable adapters comprise an adapter for a land-based vehicle application configured to mount to a land-based vehicle;
the sensing comprises sensing a land-based mode of operation corresponding to the land-based vehicle application if the adapter for the land-based vehicle application is releasably coupled to a housing of the camera;
the processing of the captured image comprises providing a basic monochrome display with selected automatic gain control parameters and pedestrian and/or animal detection enabled if the land-based mode of operation is sensed; and
the structural features comprise mechanical connections and/or electrical connections.

14. The method of claim 12, wherein:
the plurality of couplable adapters comprise an adapter for a maritime application configured to mount to a watercraft;
the sensing comprises sensing a maritime mode of operation corresponding to the maritime application if the adapter for the maritime application is releasably coupled to a housing of the camera;
the processing of the captured image comprises providing a red hue display and with maritime automatic gain control selections if the maritime mode of operation is sensed; and
the different mounts are differently contoured mounts.

15. The method of claim 12, wherein:
the plurality of couplable adapters comprise an adapter for a handheld application having a handle configured to be held by a user;
the sensing comprises sensing a handheld mode of operation corresponding to the handheld application or a default application; and
the processing the captured image comprises providing an absolute temperature readout and a low power mode of operation if the handheld mode of operation is sensed.

16. The method of claim 12, comprising displaying the captured image, and wherein the displaying the captured image comprises displaying the captured image in at least one of a black hot palette, a white hot palette, a red color palette, or a green color palette.

17. The method of claim 12, comprising:
storing at least one of the captured image or the processed image; and
sensing environmental conditions for processing the captured image according to the sensed environmental conditions.

18. The method of claim 12, comprising:
providing a plurality of selectable processing modes to a user;
processing the captured image according to the user selected processing mode;
generating the processed image according to the user selected processing mode; and
displaying the processed image according to the user selected processing mode.

19. The method of claim 18, wherein the plurality of selectable processing modes includes at least one of:
a night docking mode, wherein processing the captured image includes histogram equalizing and scaling the captured image to generate the processed image;
a man overboard mode, wherein processing the captured image includes applying a high pass filter to the captured image to generate the processed image;
a night cruising mode, wherein processing the captured image includes extracting a detailed part and a background part from the captured image, separately scaling the detailed part, separately histogram equalizing and scaling the background part, and adding the detailed part to the background part to generate the processed image;
a day cruising mode, wherein processing the captured image includes extracting the detailed part and the background part from the captured image, separately scaling the detailed part, separately histogram equalizing and scaling the background part, and adding the detailed part to the background part to generate the processed image;
a hazy conditions mode, wherein processing the captured image includes applying a non-linear low pass filter on the captured image, and then histogram equalizing and scaling the filtered image to generate the processed image; or
a shoreline mode, wherein processing the captured image includes applying at least a Huff or Hough transform operation on the captured image to generate the processed image.

20. A non-transitory computer-readable medium on which is stored information for performing the method of claim 12.

21. The system of claim 1, wherein each adapter is configured to trigger the mode sensing component via a mechanical triggering mechanism, an electronic triggering mechanism, an electro-mechanical triggering mechanism, and/or an electro-magnetic triggering mechanism of the mode sensing component to provide the mode sensing signal.

22. The system of claim 1, wherein:
the image captured by the image capture component comprises an infrared image; and
the image capture component comprises a focal plane array of infrared sensors to capture the infrared image.

23. The system of claim 1, further comprising a memory configured to store the plurality of modes of operation;
wherein the mode sensing component is configured to:
sense the mount by determining a mount type associated with the mount based on the structural features of the mount; and
sense the specific mode of operation based on the mount type; and
wherein the processing component is configured to receive the mode sensing signal and process the captured image according to the specific mode of operation based on the mode sensing signal.

* * * * *

UNITED STATES PATENT AND TRADEMARK OFFICE
CERTIFICATE OF CORRECTION

PATENT NO. : 10,425,595 B2
APPLICATION NO. : 13/975104
DATED : September 24, 2019
INVENTOR(S) : Jeffrey D. Frank et al.

Page 1 of 1

It is certified that error appears in the above-identified patent and that said Letters Patent is hereby corrected as shown below:

In the Specification

In the Detailed Description:

In Column 7, Line 16, change "(GUT)" to --(GUI)--.

In Column 21, Line 1, change "sealed" to --scaled--.

In Column 23, Line 20, change "0.550" to --550--.

Signed and Sealed this
Third Day of December, 2019

Andrei Iancu
*Director of the United States Patent and Trademark Office*